United States Patent
Elshafie et al.

(10) Patent No.: US 12,212,418 B2
(45) Date of Patent: Jan. 28, 2025

(54) CHANNEL STATE INFORMATION (CSI) REDUCTION FOR DEFERRED FEEDBACK

(71) Applicant: QUALCOMM Incorporated, San Diego, CA (US)

(72) Inventors: Ahmed Elshafie, San Diego, CA (US); Ahmed Attia Abotabl, San Diego, CA (US); Yi Huang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 17/723,321

(22) Filed: Apr. 18, 2022

(65) Prior Publication Data

US 2023/0336276 A1 Oct. 19, 2023

(51) Int. Cl.
*H04L 1/1607* (2023.01)
*H04B 7/06* (2006.01)
*H04L 5/00* (2006.01)

(52) U.S. Cl.
CPC ......... *H04L 1/1671* (2013.01); *H04B 7/0626* (2013.01); *H04B 7/0658* (2013.01); *H04L 5/0053* (2013.01)

(58) Field of Classification Search
None
See application file for complete search history.

(56) References Cited

U.S. PATENT DOCUMENTS

| | | | | |
|---|---|---|---|---|
| 11,006,397 B2* | 5/2021 | Xiong | ................... | H04L 1/0026 |
| 2019/0297552 A1* | 9/2019 | Joseph | ................. | H04L 1/1812 |
| 2020/0228248 A1 | 7/2020 | Islam et al. | | |
| 2021/0037406 A1* | 2/2021 | Takeda | ................... | H04L 5/0057 |
| 2023/0113127 A1* | 4/2023 | Hosseini | ............... | H04W 72/23 370/329 |

FOREIGN PATENT DOCUMENTS

| WO | WO-2021159465 A1 * | 8/2021 | ........... H04B 7/0626 |
|---|---|---|---|
| WO | WO-2021194620 A1 * | 9/2021 | ........... H04L 1/0026 |

OTHER PUBLICATIONS

CAICT: "Discussion on DL SPS Enhancements", 3GPP TSG RAN WG1 Meeting #99, R1-1913034, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019, XP0518202791, 6 Pages, Section 1, 2. 1, 2 .4, The Whole Document.

(Continued)

*Primary Examiner* — Hong S Cho
(74) *Attorney, Agent, or Firm* — Loza & Loza, LLP

(57) ABSTRACT

Aspects of the present disclosure provide mechanisms for reducing the payload size of the channel state information (CSI) multiplexed together with deferred acknowledgement information. In some examples, a user equipment (UE) may transmit combined acknowledgement information including the respective acknowledgement information for one or more of received packets, along with turbo acknowledgement information including both the respective acknowledgement information and the respective CSI feedback for one or more remaining ones of the packets within an uplink resource.

30 Claims, 21 Drawing Sheets

(56) References Cited

OTHER PUBLICATIONS

CAICT: "Remaining Issues on DL SPS Enhancements for NR URLLC", 3GPP TSG RAN WG1 Meeting #100-e, R1-2001065, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 14, 2020, XP051853152, 5 Pages, The Whole Document, Section 2.
Partial International Search Report—PCT/US2023/016146—ISA/EPO—Jul. 3, 2023.
International Search Report and Written Opinion—PCT/US2023/016146—ISA/EPO—Aug. 24, 2023.

\* cited by examiner

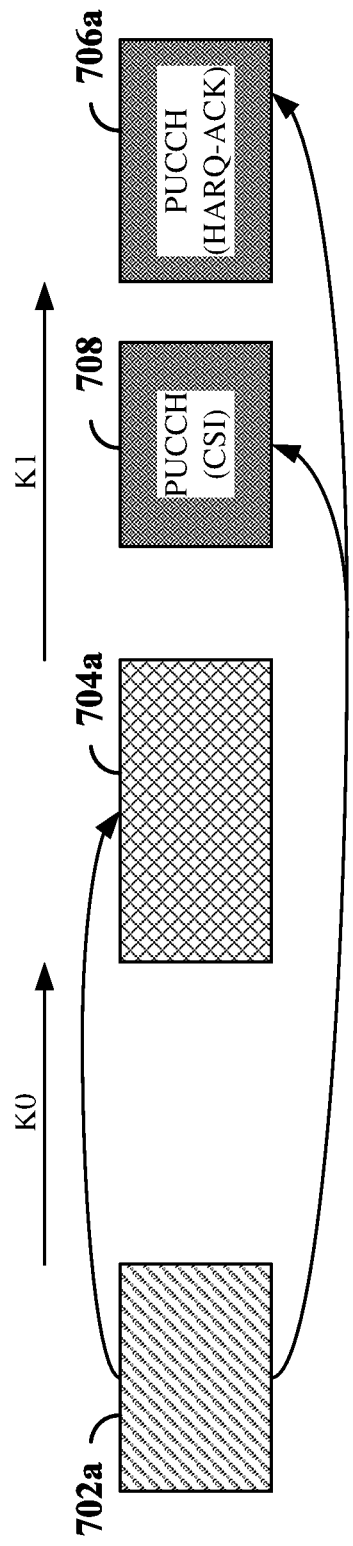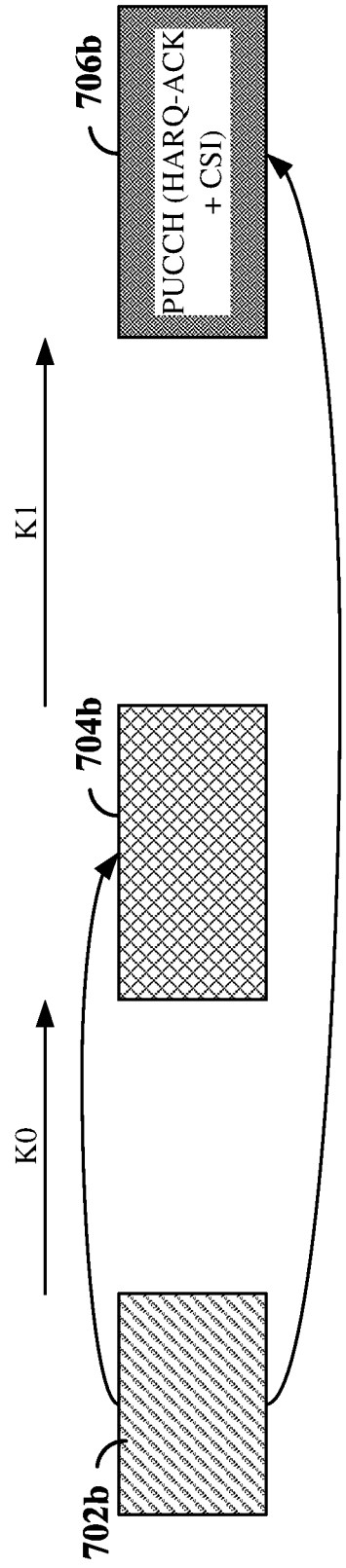

FIG. 15A

CSI Feedback (1502)
- Packet 1: Absolute CSI Values (1506a)
- Packet 2: Diff CSI Values
- ...
- Packet N: Diff CSI Values (1506b)
- (1504)

FIG. 15B

CSI Feedback (1502)
- Packet 1: Absolute CSI Values (1506a)
- Packet 2 - Packet N: Average Diff CSI Values (1506c)
- (1504)

FIG. 15C

CSI Feedback (1502)
- Packet 1: 1st Minimum Absolute CSI Values (1506d)
- ...
- Packet r: rth Minimum Absolute CSI Values
- (1504)

FIG. 15D

CSI Feedback (1502)
- Packet 1 – Packet N: Mean/Auto-Correlation/Auto-Covariance CSI Values (1506e)
- (1504)

CHANNEL STATE INFORMATION (CSI) REDUCTION FOR DEFERRED FEEDBACK

TECHNICAL FIELD

The technology discussed below relates generally to wireless communication systems, and more particularly, to providing acknowledgement feedback and channel state information feedback in a wireless communication network.

INTRODUCTION

In wireless communication systems, such as those specified under standards for 5G New Radio (NR), a network entity (e.g., a base station) may communicate with a user equipment (UE) (e.g., a smartphone). The communication can utilize a modulation and coding scheme (MCS), rank, and precoding matrix selected based on an estimate of the channel between the base station and the UE. To assist the UE in estimating the channel, the base station may transmit one or more reference signals, such as channel state information—reference signals (CSI-RS) or synchronization signal blocks (SSBs), or one or more packets to the UE.

After channel estimation, the UE may return a channel state information (CSI) report indicating the quality of the channel to the base station. The CSI may include, for example, a channel quality indicator (CQI) that indicates to the base station an MCS to use for transmissions to the UE, a rank indicator (RI) that indicates to the base station the number of layers to use for transmissions to the UE, a precoding matrix indicator (PMI) that indicates to the base station the precoding matrix to use for transmissions to the UE, and other suitable parameters.

5G NR networks may further employ various mechanisms to maximize throughput and minimize delay. One such mechanism is the Hybrid Automatic Repeat Request (HARQ) process, which may combine both Forward Error Correction (FEC) and Automatic Repeat Request (ARQ) to correct errors in received packets. FEC adds redundancy (parity bits) to the transmitted data to enable a certain amount of erroneously received bits to be corrected at the receiver. If a packet arrives having a higher number of errors than can be corrected using FEC, the ARQ process is initiated to request a retransmission of the packet from the sender.

In general, HARQ uses a stop and wait (SAW) protocol, in which a transmitting entity waits to receive an acknowledged (ACK) or not acknowledged (NACK) back from the receiving entity before transmitting another packet or retransmitting the same packet. For example, in response to a NACK, the transmitting device may send a HARQ retransmission, which may implement chase combining, incremental redundancy, etc. To fully utilize the bandwidth and increase throughput, multiple parallel HARQ processes may be initiated offset in time from one another. Each HARQ process is identified by a unique HARQ process identifier (ID).

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a user equipment (UE) configured for wireless communication is disclosed. The UE includes a transceiver, a memory, and a processor coupled to the transceiver and the memory. The processor is configured to receive a plurality of packets over time from a network entity, transmit combined acknowledgement information comprising respective first acknowledgement information for one or more packets of the plurality of packets to the network entity within an uplink resource, and transmit turbo acknowledgement information comprising respective second acknowledgement information and respective channel state information (CSI) feedback for one or more remaining packets of the plurality of packets to the network entity within the uplink resource.

Another example provides a method for wireless communication at a user equipment (UE). The method includes receiving a plurality of packets over time from a network entity, transmitting combined acknowledgement information comprising respective first acknowledgement information for one or more packets of the plurality of packets to the network entity within an uplink resource, and transmitting turbo acknowledgement information comprising respective second acknowledgement information and respective channel state information (CSI) feedback for one or more remaining packets of the plurality of packets to the network entity within the uplink resource.

Another example provides A network entity configured for wireless communication. The network entity includes a memory and a processor coupled to the memory. The processor is configured to transmit a plurality of packets over time, receive combined acknowledgement information comprising respective first acknowledgement information for one or more packets of the plurality of packets within an uplink resource, and receive turbo acknowledgement information comprising respective second acknowledgement information and respective channel state information (CSI) feedback for one or more remaining packets of the plurality of packets within the uplink resource.

Another example provides a method for wireless communication at a network entity. The method includes transmitting a plurality of packets over time, receiving combined acknowledgement information comprising respective first acknowledgement information for one or more packets of the plurality of packets within an uplink resource, and receiving turbo acknowledgement information comprising respective second acknowledgement information and respective channel state information (CSI) feedback for one or more remaining packets of the plurality of packets within the uplink resource.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or

BRIEF DESCRIPTION OF THE DRAWINGS

FIGS. 7A and 7B illustrate examples of CSI reporting based on downlink data packets according to some aspects.

FIGS. 15A-15D illustrate examples of CSI feedback that may be included within turbo acknowledgement information according to some aspects.

DETAILED DESCRIPTION

Figure 1:
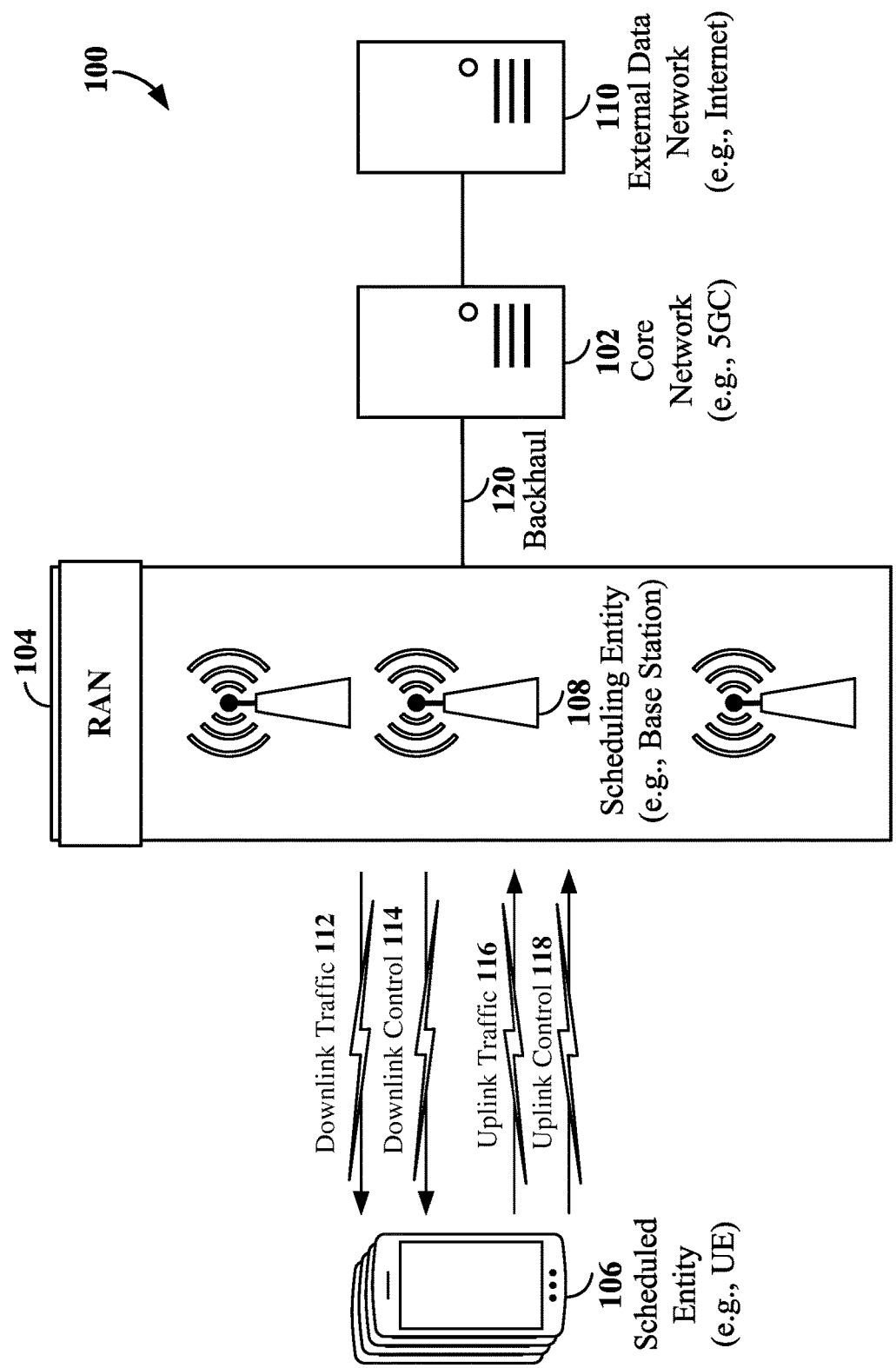
FIG. 1 is a diagram illustrating an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

A UE may generate channel state information (CSI) based on received reference signals or received packets (e.g., physical downlink shared channel (PDSCH) transmissions). In examples in which the CSI is generated based on received packets, the UE may multiplex the CSI feedback (e.g., a CSI report including one or more CSI values) and acknowledgement information (e.g., HARQ feedback) for the received packet within an uplink resource. The combination of the CSI feedback and the acknowledgement information may be referred to herein as turbo acknowledgement information (e.g., turbo HARQ).

Packets may be scheduled dynamically or semi-persistently. For semi-persistently scheduled (SPS) packets or for multiple packets simultaneously scheduled dynamically, the acknowledgement information for two or more of the packets may be held and deferred until an uplink resource is available to transmit the acknowledgement information. If turbo HARQ is enabled for the SPS packets and/or dynamically scheduled packets, the amount of turbo acknowledgement information deferred and multiplexed within a next available uplink resource may exceed the size of the uplink resource.

Various aspects of the disclosure provide mechanisms for reducing the payload size of the CSI associated with deferred turbo acknowledgement information. In some examples, the UE may transmit acknowledgement information for all of the packets, but may transmit turbo acknowledgement information (including the CSI feedback) for only a portion of the packets. For example, the UE may transmit combined acknowledgement information including the respective acknowledgement information for one or more of the packets, along with turbo acknowledgement information including both the respective acknowledgement information and the respective CSI feedback for one or more remaining ones of the packets within an uplink resource.

In some examples, the turbo acknowledgement information may be transmitted for a single packet. For example, the single packet may be a last received packet. In other examples, the turbo acknowledgement information may be transmitted for a plurality of packets. For example, the UE may receive a turbo acknowledgement configuration indicating a number of packets for which turbo acknowledgement information may be transmitted. The number of packets may be explicitly defined (e.g., a number of last received packets) or may be indicated by a bitmap or pattern. The turbo acknowledgement configuration may be transmitted, for example, within downlink control information (DCI), a medium access control (MAC) control element (MAC-CE), or a radio resource control (RRC) message. In examples in which the packets are associated with two or more SPS configurations, the UE may receive the turbo acknowledgement configuration within DCI activating or reactivating the two or more SPS configurations. In some examples, the turbo acknowledgement configuration may indicate a respective number of packets for which turbo acknowledgement is provided for each of the SPS configurations. The reduced CSI feedback is not limited to the examples described herein, but may include any reduced CSI feedback included within turbo acknowledgement information, and as also described herein below.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station. In addition, one or more of the base stations may have a disaggregated configuration.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmissions. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
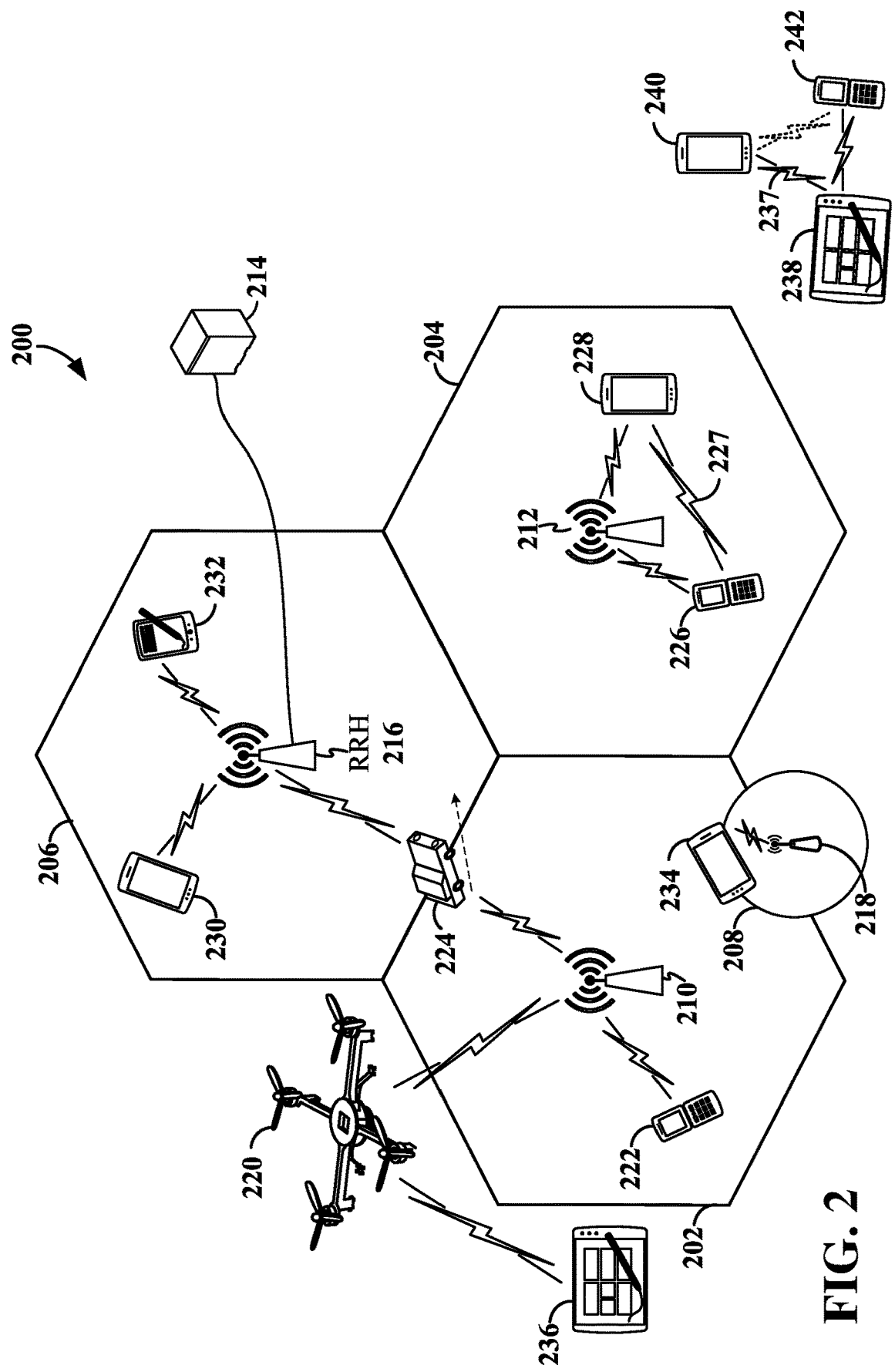
FIG. 2 is a diagram illustrating an example of a radio access network (RAN) according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
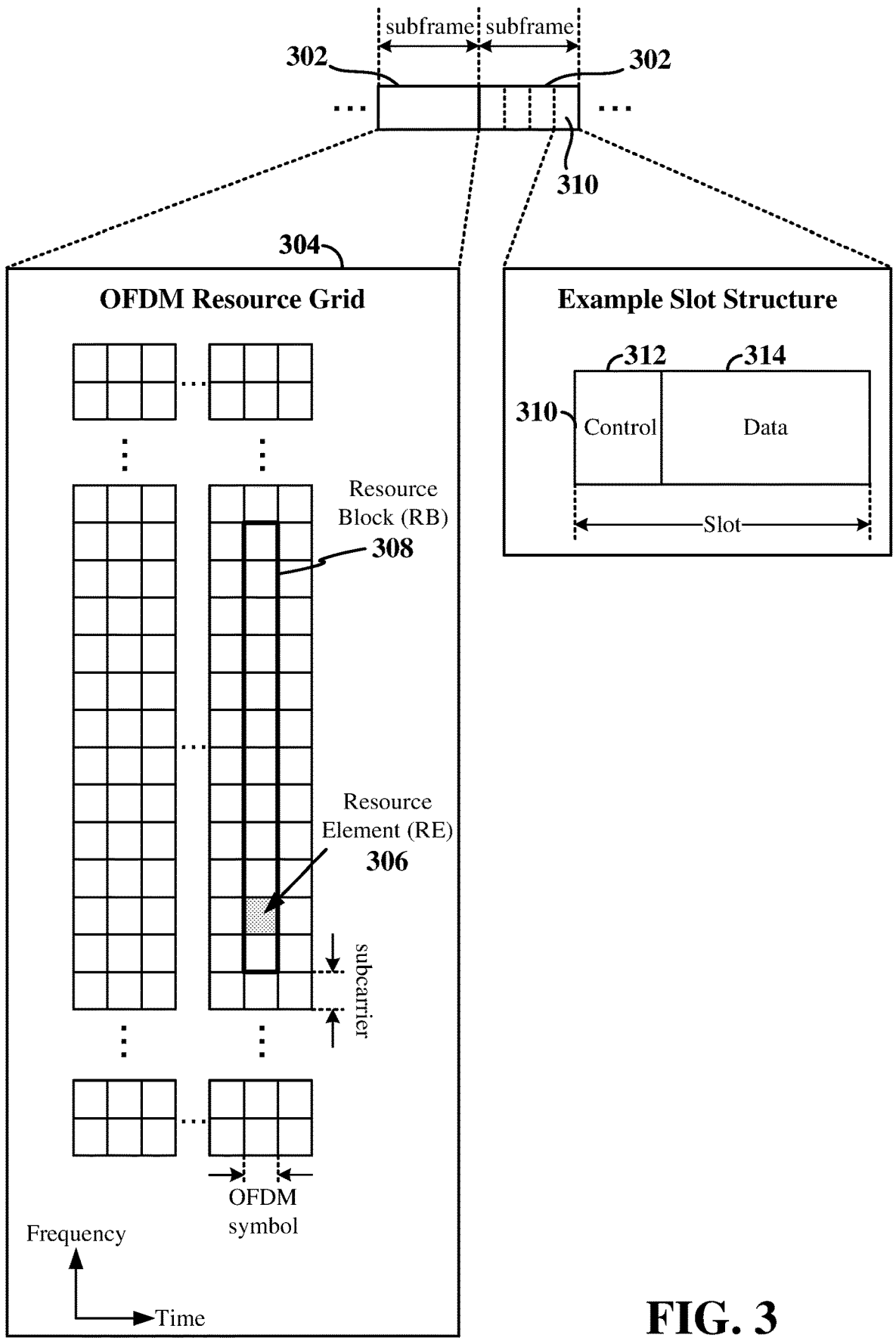
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgement (ACK) or negative acknowledgement (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
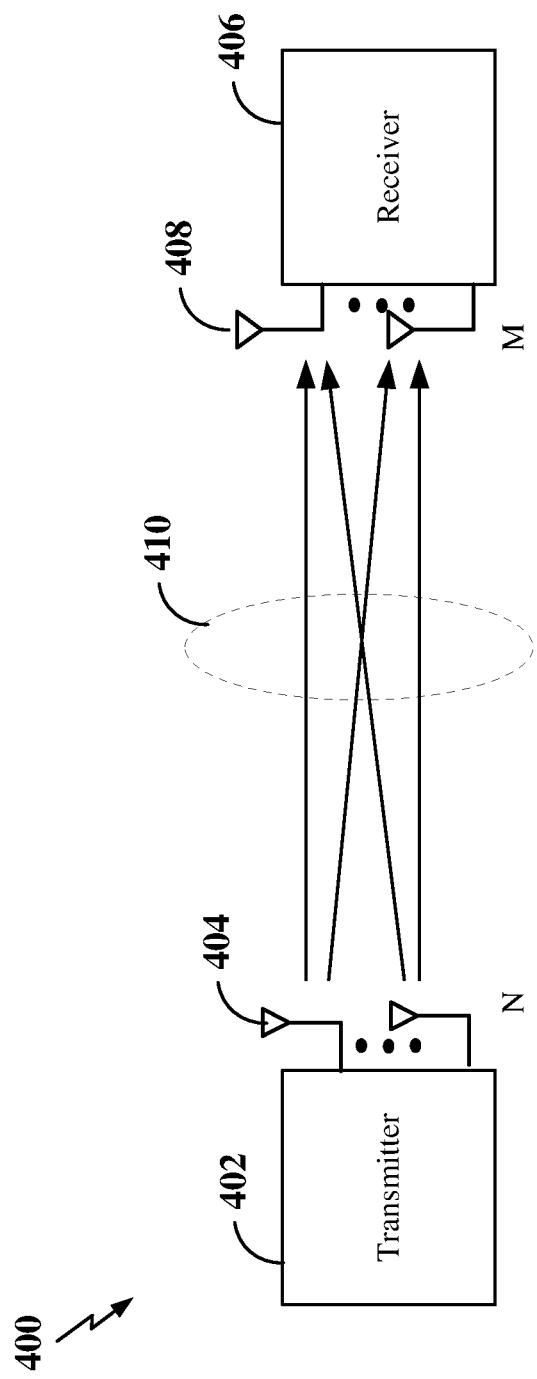
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO and/or beamforming system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as a SSB or CSI-RS, on each of a plurality of beams in a beam-sweeping manner. In some examples, SSBs may be transmitted on the wider beams, whereas CSI-RSs may be transmitted on the narrower beams. The UE may measure the reference signal received power (RSRP) or signal-to-interference-plus-noise ratio (SINR) on each of the beams and transmit a beam measurement report (e.g., a Layer 1 (L1) measurement report) to the base station indicating the RSRP or SINR of one or more of the measured beams. The base station may then select the particular beam for communication with the UE based on the L1 measurement report. In other examples, when the channel is reciprocal, the base station may derive the particular beam to communicate with the UE based on uplink measurements of one or more uplink reference signals, such as a sounding reference signal (SRS).

In addition to L1 measurement reports, a UE can further utilize the reference signal(s) to estimate the channel quality of the channel between the base station and the UE. For example, the UE may measure the SINR of each received CSI-RS and generate a CSI report based on the measured SINR. The CSI report may include, for example, a channel quality indicator (CQI), rank indicator (RI), precoding matrix indicator (PMI), and/or strongest layer indicator (SLI). The scheduling entity may use the CSI report to select a rank for the scheduled entity (e.g., based on the RI), along with a precoding matrix (e.g., based on the PMI) and a MCS (e.g., based on the CQI) to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The SLI may be utilized to indicate which column of the precoding matrix of the reported PMI corresponds to the strongest layer codeword corresponding to the largest reported wideband CQI.

Figure 5:
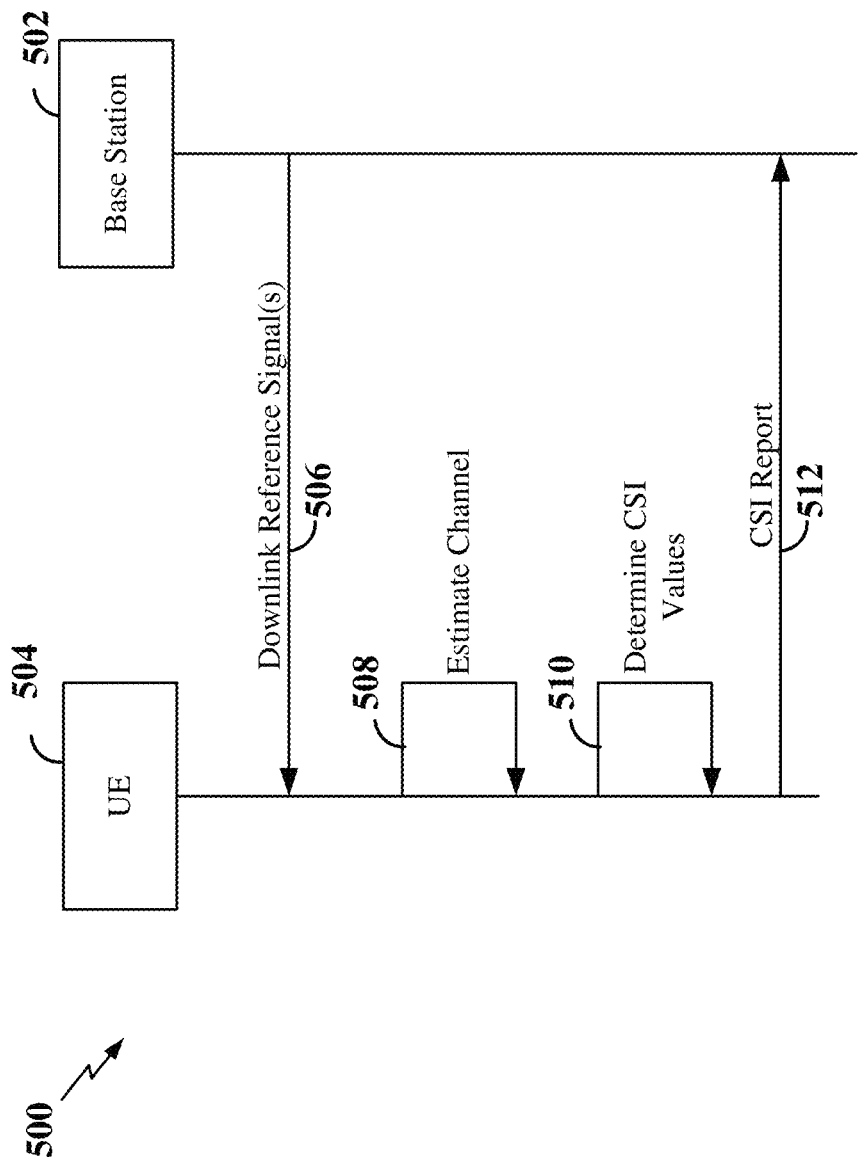
FIG. 5 is a signaling diagram illustrating exemplary signaling between a scheduling entity and a scheduled entity to provide channel state information feedback (CSF) according to some aspects.

FIG. 5 is a signaling diagram illustrating exemplary signaling 500 between a network entity 502 and a UE 504 to provide channel state information feedback (CSF) within a wireless network. In the illustrated scenario, the UE 504 can provide a CSI report to the network entity 502. The network entity 502 may correspond, for example, to a base station (e.g., gNB or eNB) or other network entity as shown in FIGS. 1 and/or 2. The network entity 502 may be implemented as an aggregated base station or a disaggregated base station. In a disaggregated base station architecture, the network entity 502 may include one or more of a central unit (CU), a distributed unit (DU), or a radio unit (RU). The UE 504 may correspond, for example, to a UE or other scheduled node as shown in FIGS. 1 and/or 2.

At 506, the network entity 502 may transmit a reference signal, such as a CSI-RS, to the UE 504. In some examples, the reference signal may include a plurality of reference signals. Reference signals may be transmitted via a respective channel measurement resource. Channel measurement resources may include time-frequency resources, along with a beam direction, within which a particular reference signal can be transmitted. For example, channel measurement resources may include a non-zero-power (NZP) CSI-RS resource. NZP resources can be utilized for channel measurement, along with one or more interference measurement resources that may be utilized for interference measurements. Interference measurement resources may include a zero-power (ZP) CSI-RS resource and an NZP CSI-RS resource with similar properties as the NZP CSI-RS resource utilized for channel measurement. In addition, each reference signal may include a number of pilots allocated within the respective channel measurement resource.

At 508, the UE 504 can estimate the wireless channel based on the reference signal(s). For example, the UE 504 may measure the SINR of one or more of the reference signals to obtain a channel estimate of the wireless channel.

At 510, the UE 504 may determine various CSI values from the channel estimate. For example, the UE 504 may determine a RI, PMI, CQI, and SLI from the channel estimate. The CQI may include an index (e.g., a CQI index) ranging, for example, from 0 to 15. The CQI index may indicate, for example, the highest MCS at which the Block Error Rate (BLER) of the channel does not exceed 10%. Once determined, the CSI values can be fed back. For example, at 512, the UE 504 may transmit a CSI report, including the determined CSI values to the network entity 502.

The network entity 502 and UE 504 may each support different types of CSI reports (including L1 measurement reports) and/or different types of measurements. To distinguish between the different report/measurement types and measurement configurations, the network entity 502 may configure the UE 504 with one or more report settings. Each report setting may be associated with a resource setting indicating a configuration of one or more reference signals (e.g., CSI-RSs) for use in generating the CSI report.

Figure 6:
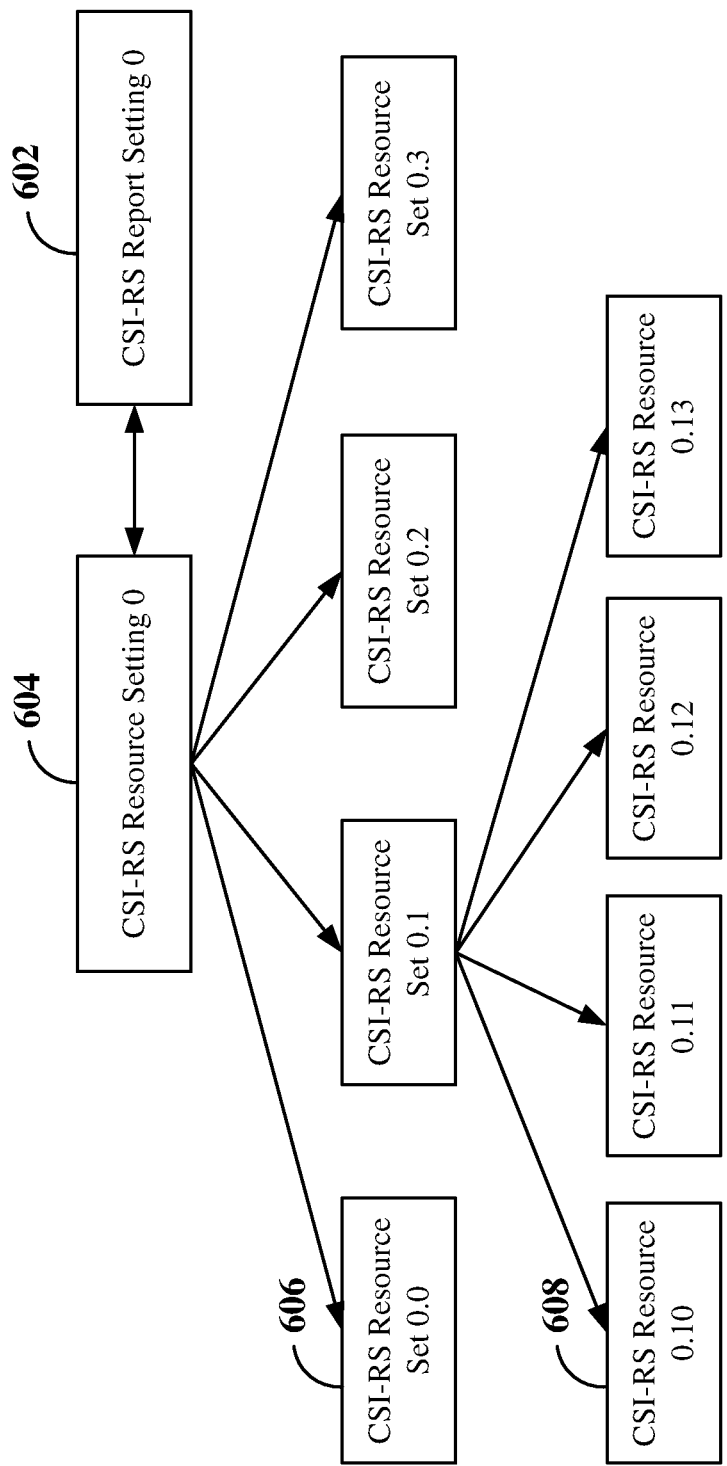
FIG. 6 is a diagram illustrating an example of channel state information (CSI) resource mapping according to some aspects.

FIG. 6 illustrates an exemplary CSI resource mapping to support different report/measurement configurations. The CSI resource mapping includes CSI report settings 602, CSI resource settings 604, CSI resource sets 606, and CSI resources 608. Each CSI resource setting 604 includes one or more CSI resource sets 606, and each CSI resource set 606 includes one or more CSI resources 608. In the example shown in FIG. 6, a single CSI resource setting (e.g., CSI Resource Setting 0) and a single CSI report setting (e.g., CSI Report Setting 0) are illustrated. However, it should be understood that any suitable number of CSI resource settings 604 and CSI report settings 602 may be supported.

Each CSI report setting 602 may include a reportQuantity that indicates, for example, the specific CSI quantities and granularity thereof (e.g., wideband/sub-band CQI, PMI, RI, L1, etc.), or L1 quantities (e.g., L1-RSRP, L1-SINR) to include in a CSI report. The CSI report setting 602 may further indicate a periodicity of the CSI report. For example, the CSI report setting 602 may indicate that the report should be generated periodically, aperiodically, or semi-persistently. For aperiodic CSI report settings 602, the CSI report may be sent on the PUSCH and may or may not be multiplexed with uplink data. For periodic CSI report settings 602, the CSI report may be sent on the PUCCH (e.g., a short PUCCH or a long PUCCH). For semi-persistent CSI report settings 602, the CSI report may be sent on the PUCCH or the PUSCH. For example, semi-persistent CSI reports sent on the PUCCH may be activated or deactivated using a medium access control (MAC) control element (MAC-CE). Semi-persistent CSI reports sent on the PUSCH may be triggered using downlink control information (DCI) scrambled with a semi-persistent CSI (SP-CP) radio network temporary identifier (SP-CP-RNTI). The DCI triggering the semi-persistent CSI reporting may further allocate semi-persistent resources and an MCS for the CSI report. Semi-persistent CSI report settings 602 may further support Type II codebooks and a minimum periodicity of 5 ms. In some examples, periodic and semi-persistent CSI report settings 602 may support the following periodicities: {5, 10, 20, 40, 80, 160, and 320} slots. CSI report settings 602 may further include a respective priority and other suitable parameters.

Each CSI report setting 602 may be linked to a CSI resource setting 604. Each CSI resource setting 604 may be associated with a particular time domain behavior of reference signals. For example, each CSI resource setting 604 may include periodic, semi-persistent, or aperiodic CSI resources 608. For periodic and semi-persistent CSI resource settings 604, the number of configured CSI resource sets 606 may be limited to one. In general, the CSI resource settings 604 that may be linked to a particular CSI report setting 602 may be limited by the time domain behavior of the CSI resource setting 604 and the CSI report setting 602. For example, an aperiodic CSI report setting 602 may be linked to periodic, semi-persistent, or aperiodic CSI resource settings 604. However, a semi-persistent CSI report setting 602 may be linked to only periodic or semi-persistent CSI resource settings 604. In addition, a periodic CSI report setting 602 may be linked to only a periodic CSI resource setting 604.

Each CSI resource set 606 may be associated with a CSI resource type. For example, CSI resource types may include non-zero-power (NZP) CSI-RS resources, SSB resources, or channel state information interference measurement (CSI-IM) resources. Thus, each CSI resource set 606 includes a list of CSI resources 608 of a particular CSI resource type. In addition, each CSI resource set 606 may further be associated with one or more of a set of frequency resources (e.g., a bandwidth and/or OFDM symbol(s) within a slot), a particular set of ports, a power, or other suitable parameters. In addition, for NZP CSI-RS resources, the CSI resource set 606 may be configured with a repetition parameter indicating whether or not repetition is enabled for the CSI-RS resource (e.g., the repetition parameter may be set to ON or OFF).

Each CSI resource 608 indicates the particular beam (e.g., ports), frequency resource, and OFDM symbol on which the reference signal may be measured by the wireless communication device. For example, each CSI resource 608 may indicate an RE on which a CSI-RS pilot or SSB transmitted from a particular set of ports (e.g., on a particular beam) may be measured. In the example shown in FIG. 6, CSI-RS resource set 0.1 includes four CSI-RS resources (CSI-RS resource 0.10, CSI-RS resource 0.11, CSI-RS resource 0.12, and CSI-RS resource 0.13). Each CSI resource 608 may further be indexed by a respective resource identifier (ID). The resource ID may identify not only the particular beam (e.g., ports), but also the resources on which the reference signal may be measured. For example, the resource ID may include a CSI-RS resource indicator (CRI) or a SSB resource indicator (SSBRI).

A network entity may configure a UE with one or more CSI report settings 602 and CSI resource settings 604 via, for example, radio resource control (RRC) signaling. For example, the network entity may configure the UE with a list of periodic CSI report settings 602 indicating the associated CSI resource set 606 that the UE may utilize to generate periodic CSI reports. As another example, the network entity may configure the UE with a list of aperiodic CSI report settings in a CSI-AperiodicTriggerStateList. Each trigger state in the CSI-AperiodicTriggerStateList may include a list of aperiodic CSI report settings 602 indicating the associated CSI resource sets 606 for channel (and optionally interference) measurement. As another example, the network entity may configure the UE with a list of semi-persistent CSI report settings in a CSI-SemiPersistentOnPUSCH-TriggerStateList. Each trigger state in the CSI-SemiPersistentOnPUSCH-TriggerStateList may include one CSI report setting 602 indicating the associated CSI resource set 606. The network entity may then trigger one or more of the aperiodic or semi-persistent trigger states using, for example, DCI. As indicated above, a MAC-CE may be used to activate or deactivate a semi-persistent CSI report setting 602 for a CSI report sent on the PUCCH.

In some examples, a CSI report may be generated based on a downlink packet (e.g., a PDSCH). For example, a CSI report based on PDSCH decoding may be supported for reduced latency and increased reliability. FIGS. 7A and 7B illustrate examples of CSI reporting based on downlink data packets (e.g., PDSCHs) according to some aspects. In the examples shown in FIGS. 7A and 7B, a network entity (e.g., a base station) may transmit a PDCCH 702a or 702b scheduling a corresponding PDSCH transmission 704a or 704, respectively. Each PDCCH 702a and 702b may include DCI carrying a respective value of K0, which indicates an offset between a first slot where the PDCCH (DCI) 702a or 702b scheduling the corresponding PDSCH 704a or 704b is received and a second slot where the PDSCH (e.g., data packet) 704a or 704b is scheduled. In some examples, K0 may be set equal to 0, thus indicating that the PDSCH is scheduled in the same slot as the PDCCH.

In addition, the DCI in each PDCCH 702a and 702b may further include a respective HARQ timing indicator, K1, that indicates an offset between the slot containing the PDSCH 704a or 704b and the slot where the HARQ feedback (e.g., ACK/NACK) is scheduled for the PDSCH 704a or 704b. The HARQ feedback may be transmitted, for example, in a PUCCH 706a or 706b. For example, if slot 1 contains the PDSCH 704a and K1 is set equal to two, the UE may transmit the HARQ feedback for the PDSCH within a PUCCH 706a in slot 3.

In some examples, the UE may further be configured to estimate the channel and transmit a CSI report to the network entity based on the PDSCH 704a or 704b. The CSI report may include, for example, regular CSI values or a delta-MCS calculated from the difference between a target MCS (e.g., the largest MCS index such that the estimated BLER for a transport block (packet) received with this MCS would be smaller than or equal to a BLER target (e.g., 10%)) and the MCS of the received packet. In the example shown in FIG. 7A, the CSI report may be transmitted on a separate PUCCH 708 (e.g., a separate PUCCH resource) than the PUCCH 706a carrying the HARQ feedback. The CSI PUCCH 708 may be within the same slot as the HARQ feedback PUCCH 706a or within a different slot (e.g., earlier slot or later slot, the former being illustrated). In other examples, as shown in FIG. 7B, the CSI report and HARQ feedback may be multiplexed within the same PUCCH 706b (e.g., the same PUCCH resource). Thus, in this example, the UE may transmit both the HARQ feedback and CSI feedback based on the PDSCH 704b to the network entity within a PUCCH 706b based on the HARQ timing indicator K1 for the PDSCH 704b. The combination of acknowledgement information (HARQ feedback) and CSI feedback multiplexed within a single PUCCH resource may be referred to herein as turbo acknowledgement information (turbo HARQ).

In some aspects, communications (e.g., downlink/uplink data packets and/or CSI feedback) between a network entity and a UE may be semi-persistently scheduled (SPS). Generally, SPS may be used for periodic communications based on defined settings. For example, an SPS configuration for downlink transmissions may be configured such that a PDSCH communication may be performed periodically with a certain periodicity.

Figure 8:
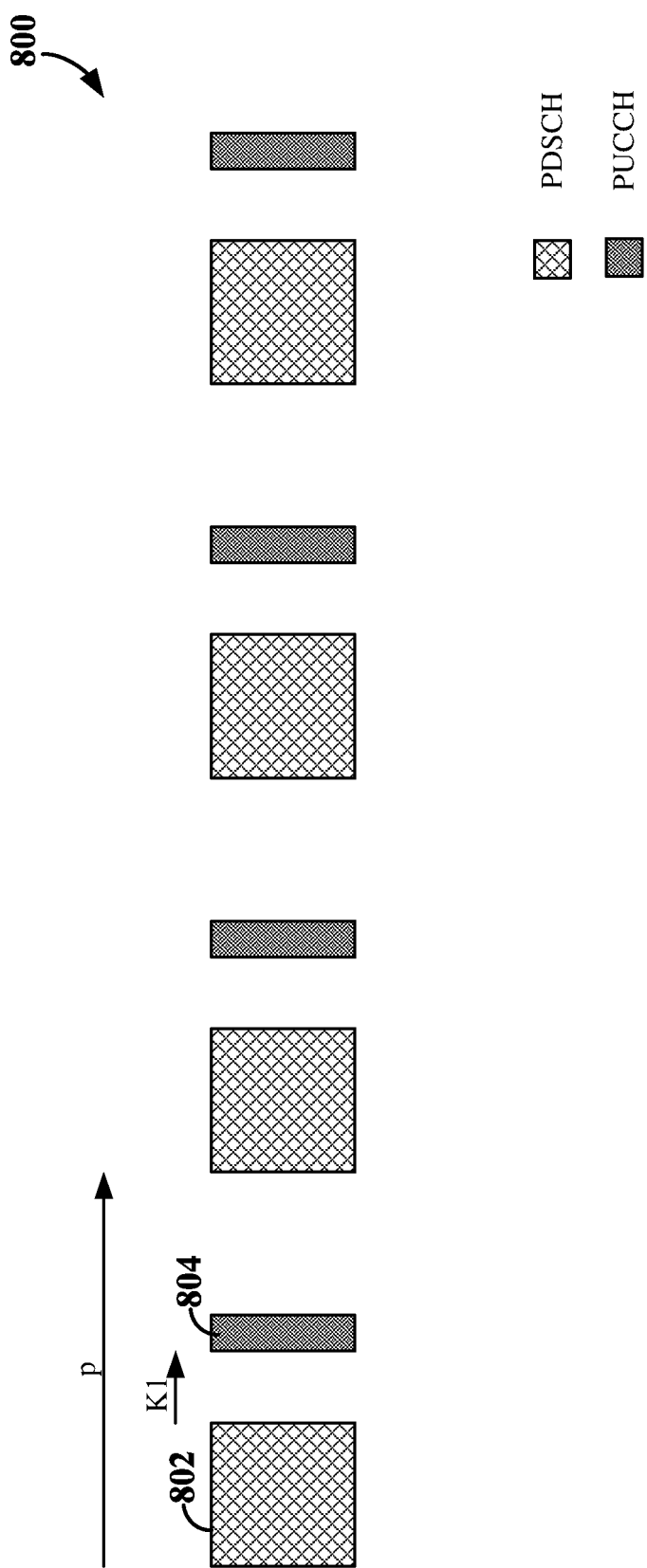
FIG. 8 is a diagram illustrating an example of a semi-persistently scheduled (SPS) configuration of downlink transmissions according to some aspects.

FIG. 8 is a diagram 800 illustrating an example of an SPS configuration of downlink transmissions according to some aspects. An SPS configuration may be configured with PDSCH SPS occasions of a periodicity p, which defines the duration of time between two consecutive PDSCH SPS occasions. The SPS configuration may further include a parameter K1, which specifies the PUCCH grant time to send HARQ feedback after receiving the PDSCH. Based on the SPS configuration, a UE may receive a PDSCH during an SPS occasion, and may then transmit feedback information (e.g., HARQ feedback) in a PUCCH, at a time indicated by K1, to indicate whether the PDSCH signal has been received successfully.

Figure 9:
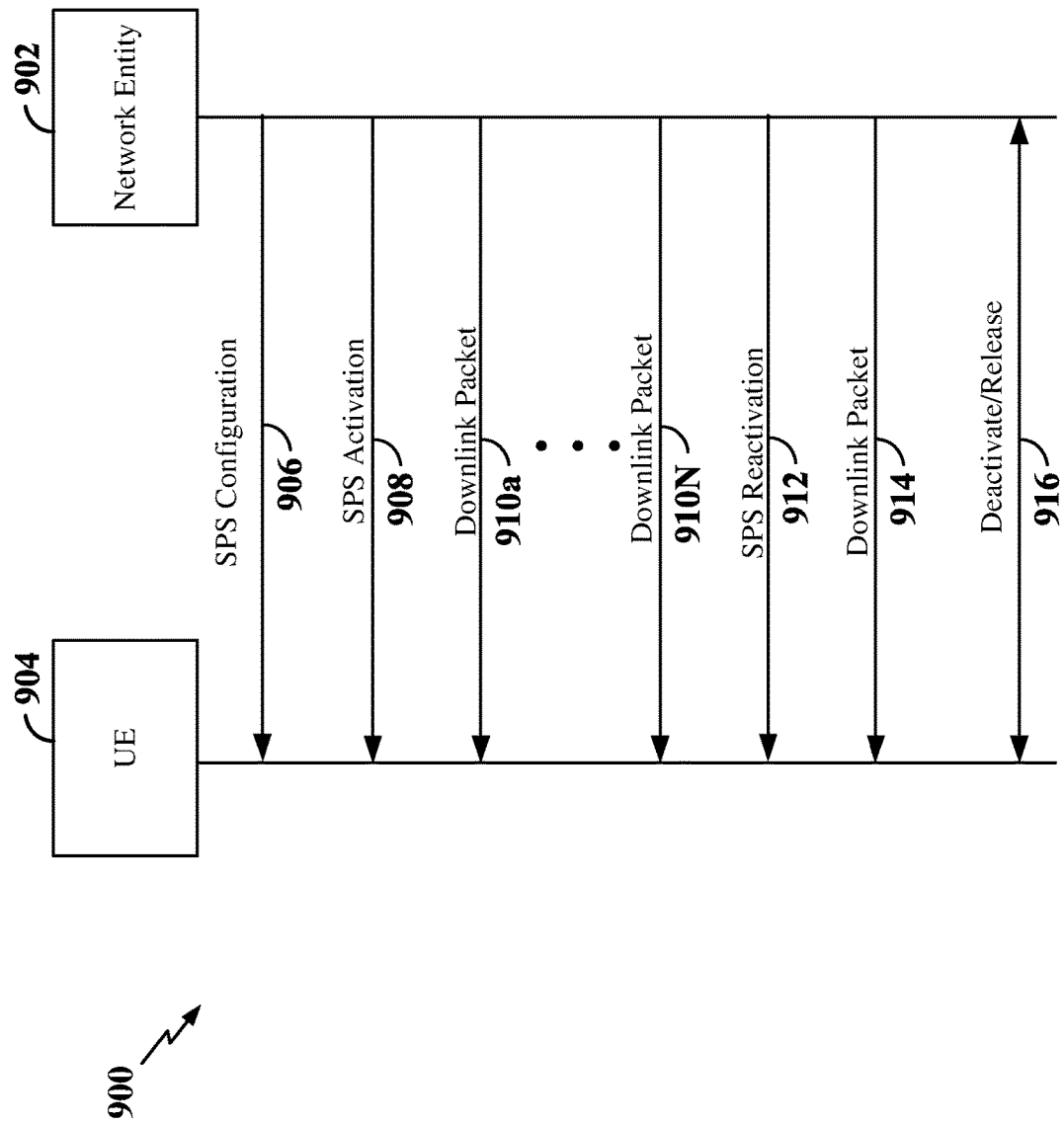
FIG. 9 is a signaling diagram illustrating exemplary signaling for semi-persistent scheduling (SPS) according to some aspects of the present disclosure.

FIG. 9 is a signaling diagram 900 illustrating exemplary signaling for semi-persistent scheduling (SPS) between a network entity 902 and a UE 904 according to some aspects of the present disclosure. The network entity 902 may be any of the network entitys (e.g., gNB, eNB, etc.) or scheduling entities shown in FIGS. 1, 2, and/or 5. The network entity 902 may be implemented as an aggregated base station or a disaggregated base station. In a disaggregated base station architecture, the network entity 902 may include one or more of a central unit (CU), a distributed unit (DU), or a radio unit (RU). The UE 904 may be any of the UEs or scheduled entities shown in FIGS. 1, 2, and/or 5.

At 906, the network entity 902 may configure an SPS configuration for the UE 904 and transmit an SPS configuration message including SPS information to the UE 904. The SPS configuration message including the SPS information may be transmitted, for example, via DCI within a PDCCH. The SPS information may include, for example, an indication of the allocated resources for the SPS configuration, a semi-persistent scheduling identifier (e.g., an SPS-RNTI) for the UE 904 and a periodicity (p) of the SPS configuration. Additional SPS information may also include, but are not limited to, an implicit release time, cyclic shift DMRS configuration, modulation and coding scheme (MCS) and/or other parameters. In some examples, the SPS configuration (e.g., the periodicity, SPS-RNTI, etc.) may be configured via a radio resource control (RRC) message and the allocated resources for the SPS configuration may be provided via DCI.

Once configured, in order to begin using the SPS configuration, at 908, the network entity 902 may then transmit an SPS activation message scrambled with the SPS-RNTI to the UE 904 to activate the SPS configuration and enable the UE 904 to utilize the SPS configuration based on the SPS information. The SPS activation message may be transmitted, for example, via DCI within a PDCCH. In some examples, the SPS activation message may be transmitted within the same DCI as the SPS information. At 910a . . . 910N, the network entity 902 may then utilize the SPS downlink resources to periodically transmit packets to the UE 904 based on the periodicity of the SPS configuration.

In some examples, the network entity 902 may update the SPS configuration and, at 912, transmit an SPS reactivation message to the UE 904 that includes the updated SPS configuration. At 914, the network entity 902 may then utilize SPS downlink resource(s) to transmit one or more additional packets to the UE 904 in accordance with the updated SPS configuration. During periods of silence or when a data transfer is complete, at 916, the SPS configuration may be deactivated/released. For example, an explicit deactivation/release message may be transmitted from the network entity 902 to the UE 904. In other examples, the network entity 902 and UE 904 may initiate a respective inactivity timer with the implicit release time received as part of the SPS information, and when the inactivity timer expires, the network entity 902 and the UE 904 may release the SPS resources.

Every SPS PDSCH occasion is configured with a K1, where K1 is the time offset between reception of the packet (PDSCH) and transmission of the HARQ feedback of the PDSCH. In some examples, if there is a collision between the K1 of an SPS configuration index and downlink slots/symbols, the UE may wait until the next available uplink slot/symbol to transmit acknowledgement information (HARQ feedback).

Figure 10:
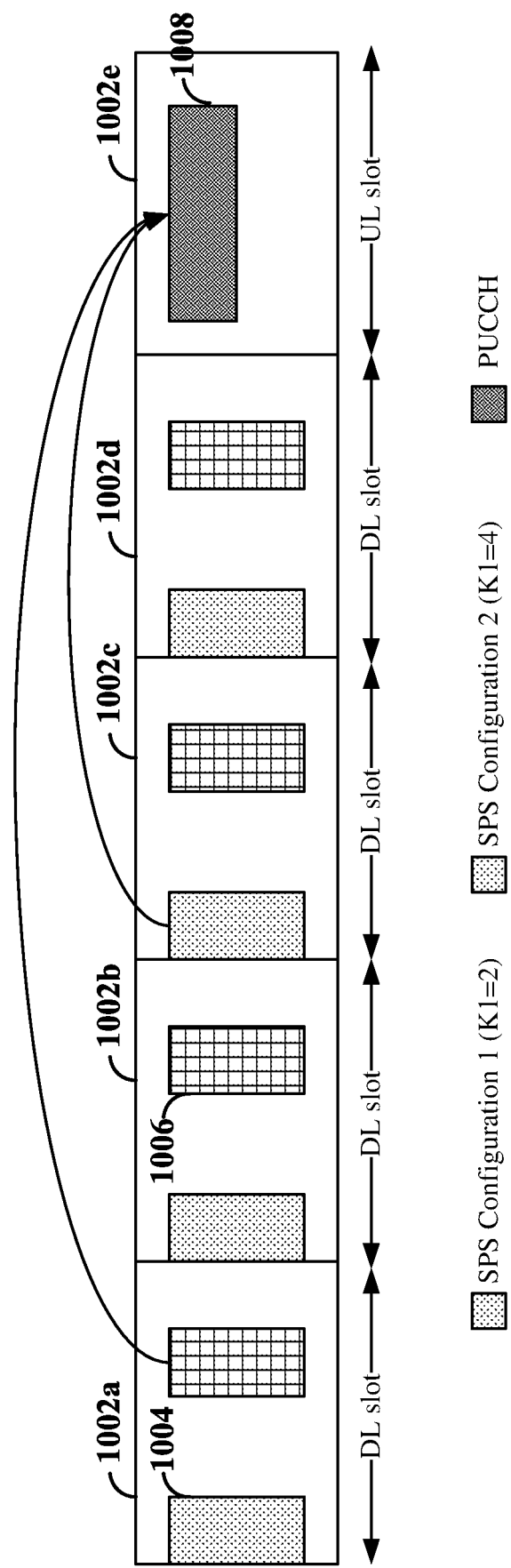
FIG. 10 is a diagram illustrating an example of delayed feedback for SPS configurations according to some aspects.

FIG. 10 is a diagram illustrating an example of delayed feedback (HARQ feedback) for SPS configurations according to some aspects. In the example shown in FIG. 10, there are two SPS configurations 1004 and 1006, each configured with a respective K1. For example, a first SPS configuration 1004 is configured with K1=2, and a second SPS configuration 1006 is configured with K1=4. Each of the first and the second SPS configurations 1004 and 1006 have a periodicity p in which a respective PDSCH occasion is scheduled in each of a plurality of consecutive downlink slots 1002a, 1002b, 1002c, and 1002d. Since the number of slots between downlink slots 1002a and 1002b and a next uplink slot 1002e (first available uplink slot/symbols) is greater than the K1 of SPS configuration 1004, the UE may hold the acknowledgement information (HARQ feedback) for the SPS occasions of the first SPS configuration 1004 in downlink slots 1002a and 1002b until the uplink slot 1002e.

Thus, based on the K1 of SPS configuration 1004, the UE may transmit a PUCCH 1008 in uplink slot 1002e including combined acknowledgement information that multiplexes the acknowledgement information for the SPS occasions (e.g., packets) of the first SPS configuration 1004 in downlink slots 1002a, 1002b, and 1002c. In addition, based on the K1 of SPS configuration 1006, the combined acknowledgement information transmitted within the PUCCH 1008 may further include the acknowledgement information for the SPS occasion (e.g., packet) of the second SPS configuration 1006 in downlink slot 1002a.

In some examples, turbo HARQ may further be enabled for the SPS configurations 1004 and 1006. In this example, the UE may transmit not only HARQ feedback (ACK/NACK bits) for each of the SPS occasions in downlink slots 1002a-1002c for SPS configuration 1004 and the SPS occasion in downlink slot 1002a for SPS configuration 1006, but also CSI bits for each of the SPS occasions. In some examples, the number of deferred turbo acknowledgement information bits may be too large to transmit in the PUCCH resource 1008.

Various aspects of the disclosure provide techniques for reducing the payload size of the CSI multiplexed with deferred acknowledgement (HARQ) feedback. In some examples, the UE may transmit the turbo acknowledgement for only a portion of the received packets, while transmitting just the acknowledgement information (HARQ feedback) for the remaining received packets.

Figure 11:
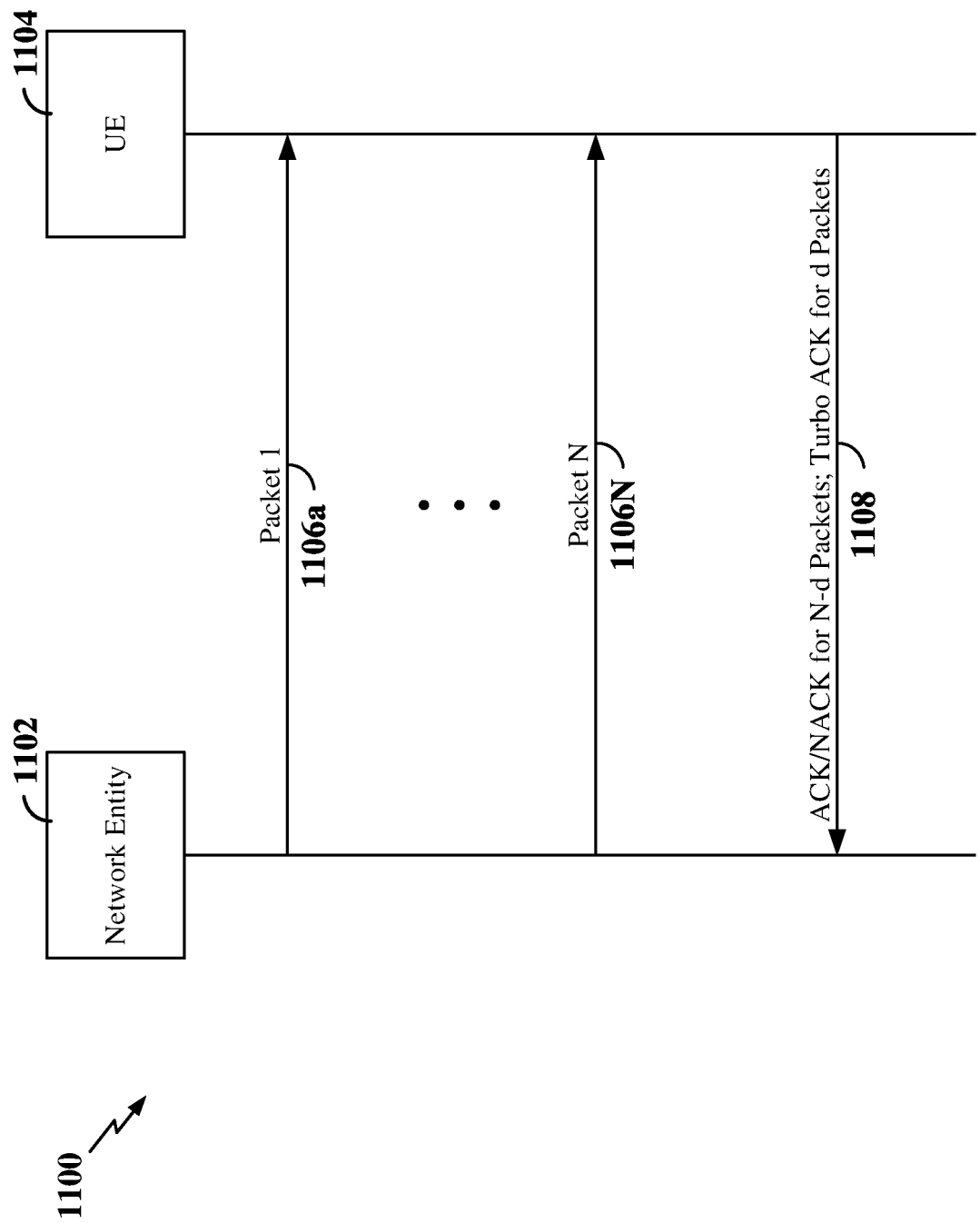
FIG. 11 is a signaling diagram illustrating exemplary signaling for deferred turbo acknowledgement information according to some aspects.

FIG. 11 is a signaling diagram 1100 illustrating exemplary signaling for deferred turbo acknowledgement information between a network entity 1102 and a UE 1104 according to some aspects. The network entity 1102 may be any of the network entitys (e.g., gNB, eNB, etc.) or scheduling entities shown in FIGS. 1, 2, 5, and/or 9. The network entity 1102 may be implemented as an aggregated base station or a disaggregated base station. In a disaggregated base station architecture, the network entity 1102 may include one or more of a central unit (CU), a distributed unit (DU), or a radio unit (RU). The UE 1104 may be any of the UEs or scheduled entities shown in FIGS. 1, 2, 5, and/or 9.

At 1106a . . . 1106N, the network entity 1102 may transmit a plurality of packets to the UE 1104. In some examples, the plurality of packets may be scheduled with a single DCI (e.g., a single DCI scheduling multiple PDSCHs). In other examples, the plurality of packets may be semi-persistently scheduled based on an SPS configuration of the packets. For example, the network entity 1102 may configure one or more SPS configurations (e.g., as shown in FIG. 9) for the UE 1104 and transmit packets to the UE 1104 based on the respective periodicities in each of the SPS configurations. In some examples, turbo HARQ may be enabled for each of the SPS configurations. As a result, the UE 1104 may further obtain respective CSI values for each of the packets received at 1106a . . . 1106N as shown, for example, in FIG. 5.

Based on the slot/symbol configuration in the network, the UE 1104 may defer the transmission of turbo acknowledgement information (e.g., HARQ feedback and associated CSI values) for each of the packets received at 1106a . . . 1106N until an uplink resource (e.g., a PUCCH) is available for the transmission of the acknowledgement information.

To reduce the payload size of the deferred turbo acknowledgement information, at 1108, the UE 1104 may transmit (e.g., multiplex) combined acknowledgement information (e.g., ACK/NACK) for a first portion of the packets (e.g., N-d packets) and turbo acknowledgement information (e.g., Turbo ACK) for a remaining portion of the packets (e.g., d packets) within an uplink resource. In some examples, d may be equal to one, and as such, the turbo acknowledgement information may be transmitted only for a single received packet. For example, the UE 1104 may transmit turbo acknowledgement information for the last received packet (e.g., the packet received at 1106N). Thus, the UE 1104 may report the acknowledgement information (HARQ-ACK without CSI) of all received packets (e.g., received PDSCHs), while sending the turbo acknowledgement information (HARQ-ACK+CSI) based on the last decoded PDSCH regardless of the SPS configuration.

In other examples, d may be greater than one. In this example, the UE 1104 may bundle the CSI values (e.g., CSI reports) for d decoded packets until the uplink grant (e.g., the uplink resource). For example, the UE 1104 may transmit the turbo acknowledgement information for the last d received packets (e.g., packet d . . . packet N). The last d received packets may be from all SPS configurations or from each SPS configuration (e.g., d packets from a first SPS configuration and d packets from a second SPS configuration). In some examples, the number of packets d may be indicated via a bitmap of PDSCHs or a pattern of PDSCHs (e.g., every other received packet regardless of the SPS configuration or per SPS configuration). In some examples, the number of packets d may be based on a time offset between the PDSCHs to capture temporal information (e.g., potential temporal interference impact). For example, the UE 1104 may transmit turbo acknowledgement information for packets #0, #3, #6, etc.

In some examples, the network entity 1102 may further utilize the CSI feedback for outer-loop link adaptation. For example, the network entity 1102 may utilize an outer-loop link adaptation process in which the MCS may be modified based on the HARQ feedback information (e.g., NACK) and the CSI feedback (e.g., delta MCS or general CSI values). By utilizing the CSI feedback to adjust the outer-loop link adaptation process, the link adaptation convergence period may be reduced, thus improving the block error rate (BLER) of subsequent transmissions. In some examples, the UE 1104 may transmit turbo acknowledgement information from one or more initial PDSCHs (e.g., the packet received at 1106*a*) to enable the network entity 1102 to track the dynamically changing channel over time, which may further improve the outer-loop link adaptation process.

In some examples, the UE 1104 may transmit the turbo acknowledgement information within the uplink resource based on the SPS configurations. For example, the UE 1104 may transmit the turbo acknowledgement information including a respective CSI report for each of two or more SPS configurations in an order of the two or more SPS configurations. In some examples, the UE 1104 may transmit the turbo acknowledgement information within the uplink resource based on the respective priorities associated with each of the SPS configurations. For example, the UE 1104 may bundle the last d CSI reports from SPS configurations having the same priority (e.g., a highest priority among the priorities of the activated SPS configurations). The CSI reports from other priority SPS configurations may be dropped or delayed until the next available uplink resource. In other examples, the UE 1104 may transmit a respective CSI report for each of the SPS priorities of the two or more SPS configurations.

In some examples, the number of packets (d), which may be indicated by an explicit number of last received packets, a time offset, a bitmap, or a pattern may be selected by the UE 1104. In other examples, the network entity 1102 may configure the number of packets (d).

Figure 12:
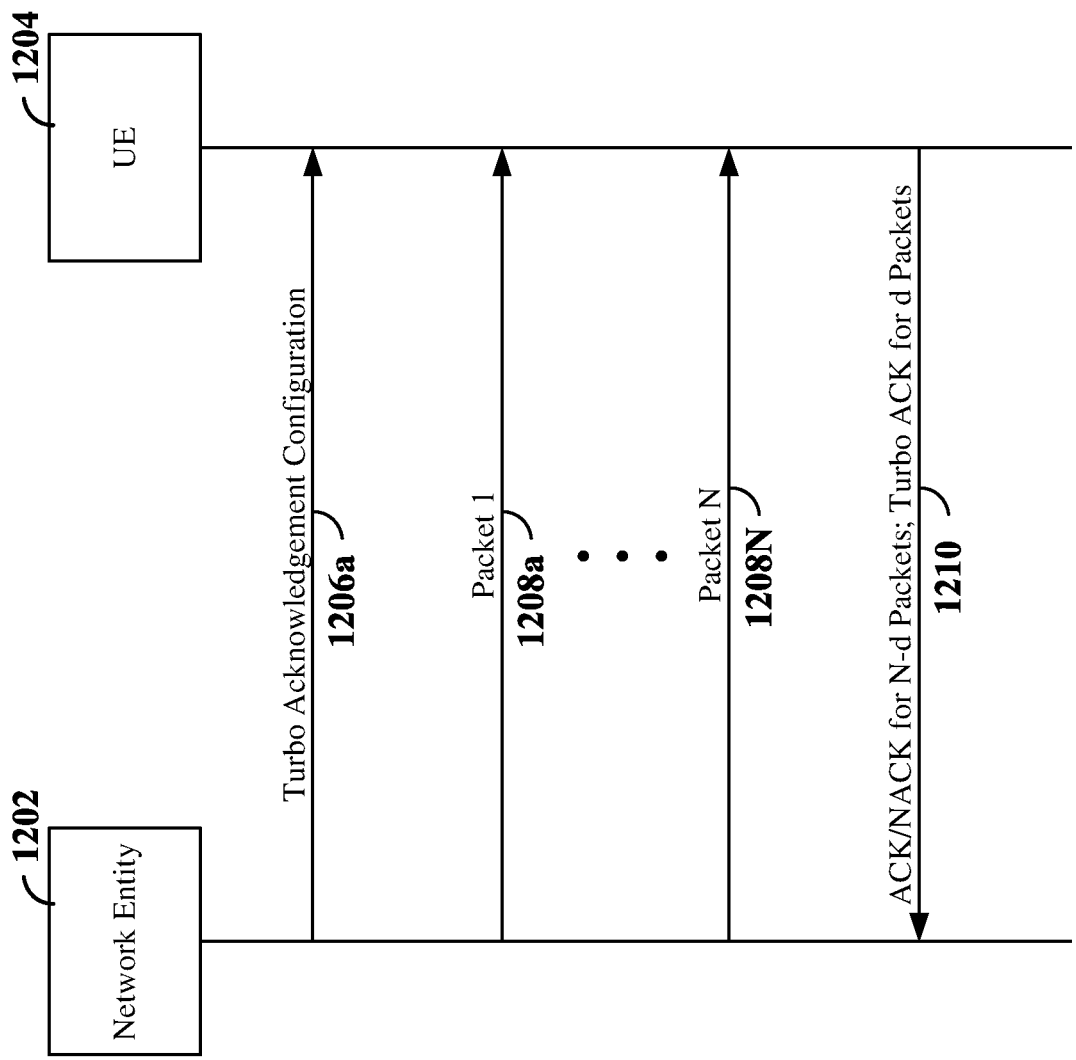
FIG. 12 is a signaling diagram illustrating other exemplary signaling for deferred turbo acknowledgement information according to some aspects.

FIG. 12 is a signaling diagram 1200 illustrating other exemplary signaling for deferred turbo acknowledgement information between a network entity 1202 and a UE 1204 according to some aspects of the present disclosure. The network entity 1202 may be any of the network entitys (e.g., gNB, eNB, etc.) or scheduling entities shown in FIGS. 1, 2, 5, 9, and/or 11. The network entity 1202 may be implemented as an aggregated base station or a disaggregated base station. In a disaggregated base station architecture, the network entity 1202 may include one or more of a central unit (CU), a distributed unit (DU), or a radio unit (RU). The UE 1204 may be any of the UEs or scheduled entities shown in FIGS. 1, 2, 5, 9, and/or 11.

At 1206, the network entity 1202 may transmit a turbo acknowledgement configuration for turbo acknowledgement information to the UE 1204. The turbo acknowledgement configuration may be transmitted, for example, within a MAC-CE or RRC message. In examples in which the network entity 1202 schedules multiple packets (PDSCHs) within a single DCI, the turbo acknowledgement configuration may be transmitted within the DCI carrying the scheduling information for the multiple packets. In examples in which the network entity 1202 configures one or more SPS configurations, the turbo acknowledgement information may be transmitted within DCI including an activation or reactivation of the one or more SPS configurations.

In some examples, the turbo acknowledgement configuration may indicate a number of packets for which turbo acknowledgement information should be transmitted as part of deferred acknowledgement information. The number of packets may be configured per SPS configuration, for all SPS configurations, or for all received packets for which deferred acknowledgement information is accumulated. For example, the turbo acknowledgement configuration may indicate that turbo acknowledgement information should be sent for a single packet, such as the last received packet. As another example, the turbo acknowledgement information may indicate that turbo acknowledgement information should be sent for a plurality of packets. For example, the turbo acknowledgement configuration may indicate that turbo acknowledgement information should be transmitted for a given number of last received packets (e.g., per SPS configuration, for all SPS configurations, or otherwise for all received packets). As another example, the turbo acknowledgement configuration may include a bitmap, a pattern, or a time offset between received packets indicating the number of packets for which turbo acknowledgement information should be transmitted.

At 1208*a* . . . 1208N, the network entity 1202 may transmit a plurality of packets to the UE 1204. In some examples, the plurality of packets may be scheduled with a single DCI (e.g., a single DCI scheduling multiple PDSCHs). In other examples, the plurality of packets may be semi-persistently scheduled based on an SPS configuration of the packets. For example, the network entity 1202 may configure one or more SPS configurations (e.g., as shown in FIG. 9) for the UE 1204 and transmit packets to the UE 1204 based on the respective periodicities in each of the SPS configurations. The UE 1204 may further obtain respective CSI values for each of the packets received at 1208*a* . . . 1208N as shown, for example, in FIG. 5.

At 1210, the UE 1204 may utilize the turbo acknowledgement configuration to transmit (e.g., multiplex) combined acknowledgement information (e.g., ACK/NACK) for a first portion of the packets (e.g., N-d packets) and turbo acknowledgement information (e.g., Turbo ACK) for a remaining portion of the packets (e.g., d packets) within an uplink resource. For example, the UE 1204 may transmit combined acknowledgement information including respective first acknowledgement information for one or more packets of the plurality of packets received at 1208*a* . . . 1208N to the network entity 1202 within the uplink resource. In addition, the UE 1204 may transmit turbo acknowledgement information including respective second acknowledgement information and respective channel state information (CSI) feedback for one or more remaining packets of the plurality of packets to the network entity 1202 within the uplink resource.

Figure 13:
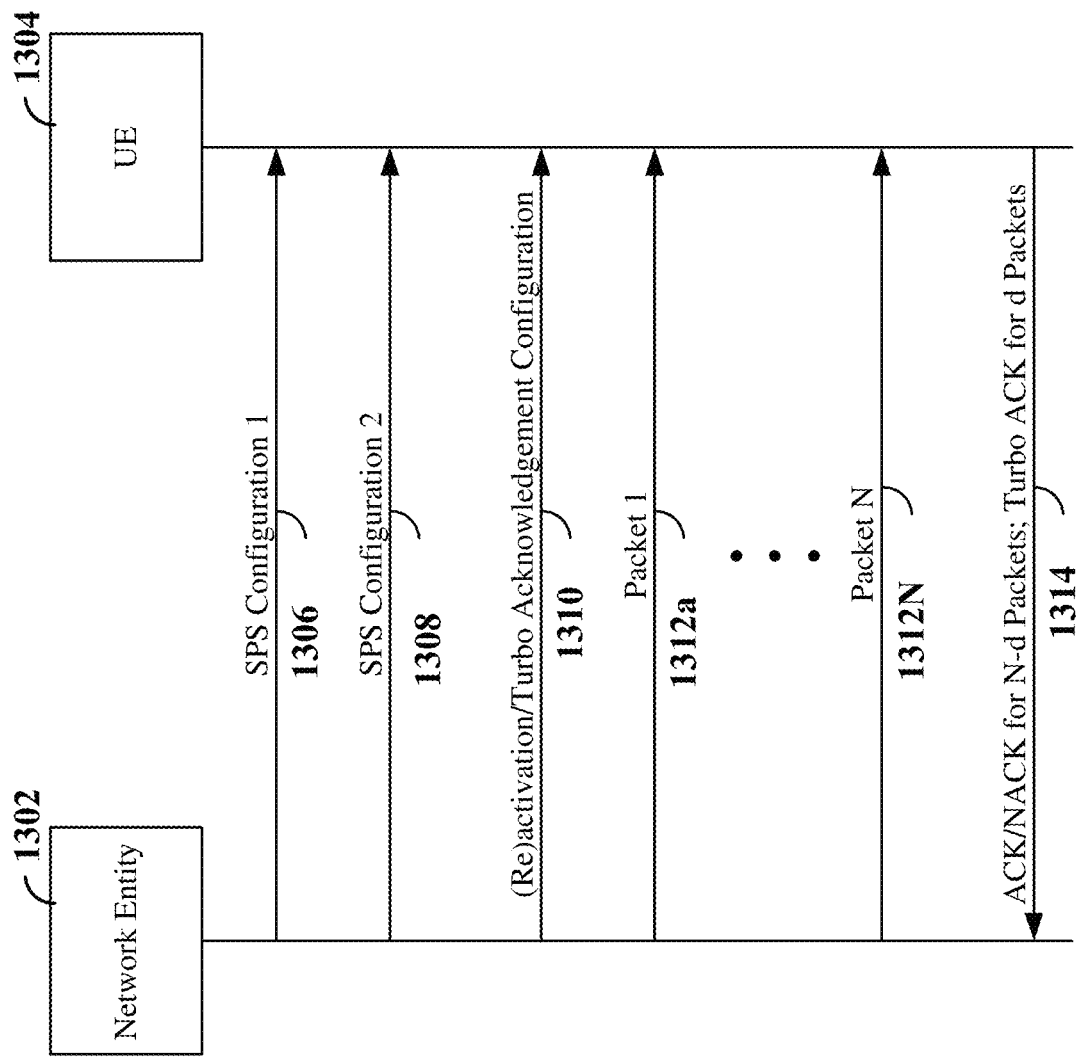
FIG. 13 is a signaling diagram illustrating other exemplary signaling for deferred turbo acknowledgement information according to some aspects.

FIG. 13 is a signaling diagram 1300 illustrating other exemplary signaling for deferred turbo acknowledgement information between a network entity 1302 and a UE 1304 according to some aspects of the present disclosure. The network entity 1302 may be any of the network entitys (e.g., gNB, eNB, etc.) or scheduling entities shown in FIGS. 1, 2, 5, 9, 11, and/or 12. The network entity 1302 may be implemented as an aggregated base station or a disaggregated base station. In a disaggregated base station architecture, the network entity 1302 may include one or more of a central unit (CU), a distributed unit (DU), or a radio unit (RU). The UE 1304 may be any of the UEs or scheduled entities shown in FIGS. 1, 2, 5, 9, 11, and/or 12.

At 1306, the network entity 1302 may transmit a first SPS configuration including first SPS information to the UE 1304. In addition, at 1308, the network entity 1302 may transmit a second SPS configuration including second SPS information to the UE 1304. Each of the first and second SPS information may include, for example, an indication of the allocated resources for the SPS configuration, a semi-persistent scheduling identifier (e.g., an SPS-RNTI) for the UE 904 and a periodicity (p) of the SPS configuration. Additional SPS information may also include, but are not limited to, an implicit release time, cyclic shift DMRS configuration, modulation and coding scheme (MCS) and/or other parameters. In some examples, the first and second SPS configurations (e.g., the periodicity, SPS-RNTI, etc.) may be configured via a radio resource control (RRC) message and the allocated resources for the SPS configuration may be provided via DCI.

At 1310, the network entity 1302 may transmit an activation message or reactivation message for the first and second SPS configurations to the UE 1304. For example, the activation/reactivation message may be transmitted within DCI. In addition, the network entity may further include a turbo acknowledgement configuration for turbo acknowledgement information associated with the first and second SPS configurations within the DCI containing the activation/reactivation message. In some examples, the turbo acknowledgement configuration may indicate a number of packets for which turbo acknowledgement information should be transmitted as part of deferred acknowledgement information. The number of packets may be configured per SPS configuration or for all SPS configurations.

At 1312a . . . 1312N, the network entity 1302 may transmit a plurality of packets to the UE 1304. In some examples, the plurality of packets may be transmitted based on the first and second SPS configurations. The UE 1304 may further obtain respective CSI values for each of the packets received at 1312a . . . 1312N as shown, for example, in FIG. 5.

At 1314, the UE 1204 may utilize the turbo acknowledgement configuration to transmit (e.g., multiplex) combined acknowledgement information (e.g., ACK/NACK) for a first portion of the packets (e.g., N-d packets) and turbo acknowledgement information (e.g., Turbo ACK) for a remaining portion of the packets (e.g., d packets) within an uplink resource. For example, the UE 1304 may transmit combined acknowledgement information including respective first acknowledgement information for one or more packets of the plurality of packets received at 1312a . . . 1312N to the network entity 1302 within the uplink resource. In addition, the UE 1304 may transmit turbo acknowledgement information including respective second acknowledgement information and respective channel state information (CSI) feedback for one or more remaining packets of the plurality of packets to the network entity 1302 within the uplink resource.

Figure 14:
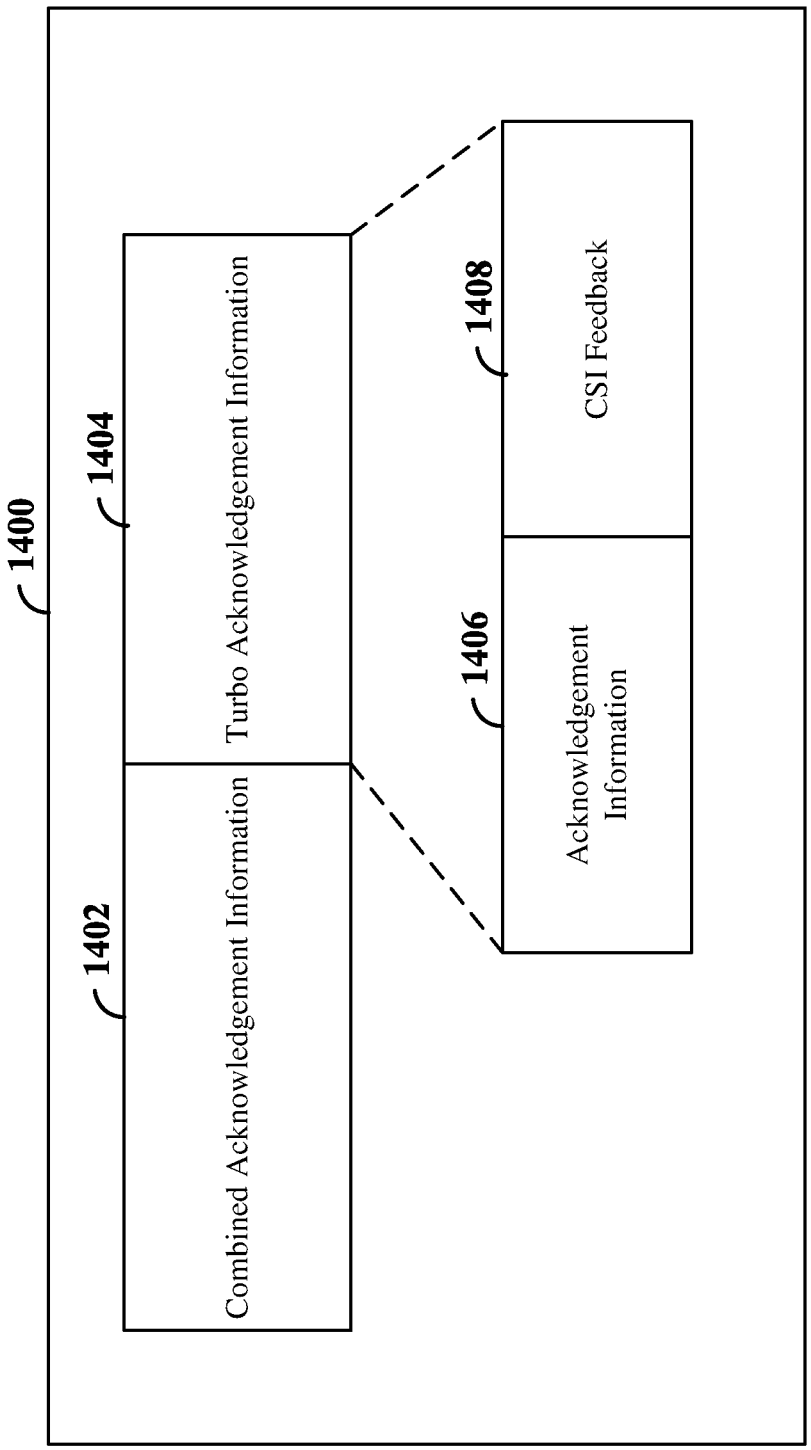
FIG. 14 is a diagram illustrating an example of a reduced CSI payload for deferred CSI and acknowledgement feedback according to some aspects.

FIG. 14 is a diagram illustrating an example of a reduced CSI payload for deferred CSI and acknowledgement feedback according to some aspects. In the example shown in FIG. 14, an uplink resource 1400 is shown including combined acknowledgement information 1402 multiplexed with turbo acknowledgement information 1404. The combined acknowledgement information 1402 may include, for example, first acknowledgement information (e.g., HARQ-ACK bits) for one or more packets of a plurality of packets received by a UE. Thus, the combined acknowledgement information may correspond to deferred acknowledgement information associated with one or more SPS configurations or multiple PDSCHs scheduled via a single DCI.

The turbo acknowledgement information 1404 may include second acknowledgement information 1406 and CSI feedback 1408 for one or more remaining packets of the plurality of packets received by the UE. Thus, the turbo acknowledgement information 1404 includes the CSI feedback for a subset of the plurality of packets (e.g., less than all of the packets) received by the UE. It should be noted that the HARQ-ACK bits for all of the plurality of packets are multiplexed within the uplink resource 1400 as part of one of the combined acknowledgement information 1402 or the turbo acknowledgement information 1404.

The CSI feedback 1408 included in the turbo acknowledgement information may include, for example, normal CSI values (e.g., CQI, RI, PMI, etc.) or a delta-MCS value indicating a difference between a target MCS and the MCS of the received packet. In addition, the CSI feedback 1408 may include absolute CSI values (normal CSI values and/or delta-MCS values) or compressed CSI values based on the CSI values obtained from the one or more remaining packets of the plurality of packets.

FIGS. 15A-15D illustrate examples of CSI feedback 1502 that may be included within turbo acknowledgement information according to some aspects. In the example shown in FIG. 15A, the CSI feedback 1502 for each of a plurality of packets 1504 (e.g., Packet 1 . . . Packet N) may include absolute CSI values 1506a for at least one packet (e.g., Packet 1) and differential CSI values 1506b with respect to the absolute CSI values 1506a for the other packets (e.g., Packet 2 . . . Packet N). For example, the absolute CSI values 1506a may correspond to the highest CSI values 1506a among the packets and the differential CSI values 1506b may include a differential CQI, RI, PMI, or delta-MCS with respect to the absolute CSI values 1506a. In some examples, each packet 1504 may be identified by a respective packet identifier (ID), such as a HARQ process ID.

In the example shown in FIG. 15B, the CSI feedback 1502 may include absolute CSI values 1506a for at least one packet (e.g., Packet 1) and average CSI values 1506c for the other packets (e.g., Packet 2 . . . Packet N). For example, the average CSI values 1506c may correspond to an average CQI, RI, PMI, or delta-MCS of the other packets. In some examples, instead of including absolute values for one or more packets, the CSI feedback 1502 may include average CSI values 1506c across all packets 1504.

In the example shown in FIG. 15C, the CSI feedback 1502 may include one or more minimum (lowest) absolute CSI values among the plurality of packets. For example, the CSI feedback 1502 may include the minimum absolute CSI values of a single packet (e.g., Packet 1) or the $r^{th}$ minimum absolute CSI values for r packets (e.g., Packet 1 . . . Packet r) from among the plurality of packets (Packet 1 . . . Packet N). In some examples, the CSI feedback 1502 may include the absolute CSI values of one of the packets (e.g., the lowest CSI values) and differential or average CSI values for the remaining r−1 packets.

In the example shown in FIG. 15D, the CSI feedback 1502 may include at least one of a mean, autocorrelation, or auto-covariance of CSI values 1506e (e.g., a mean, autocorrelation, or auto-covariance of the CSI reports) associated with the plurality of packets 1504.

Figure 16:
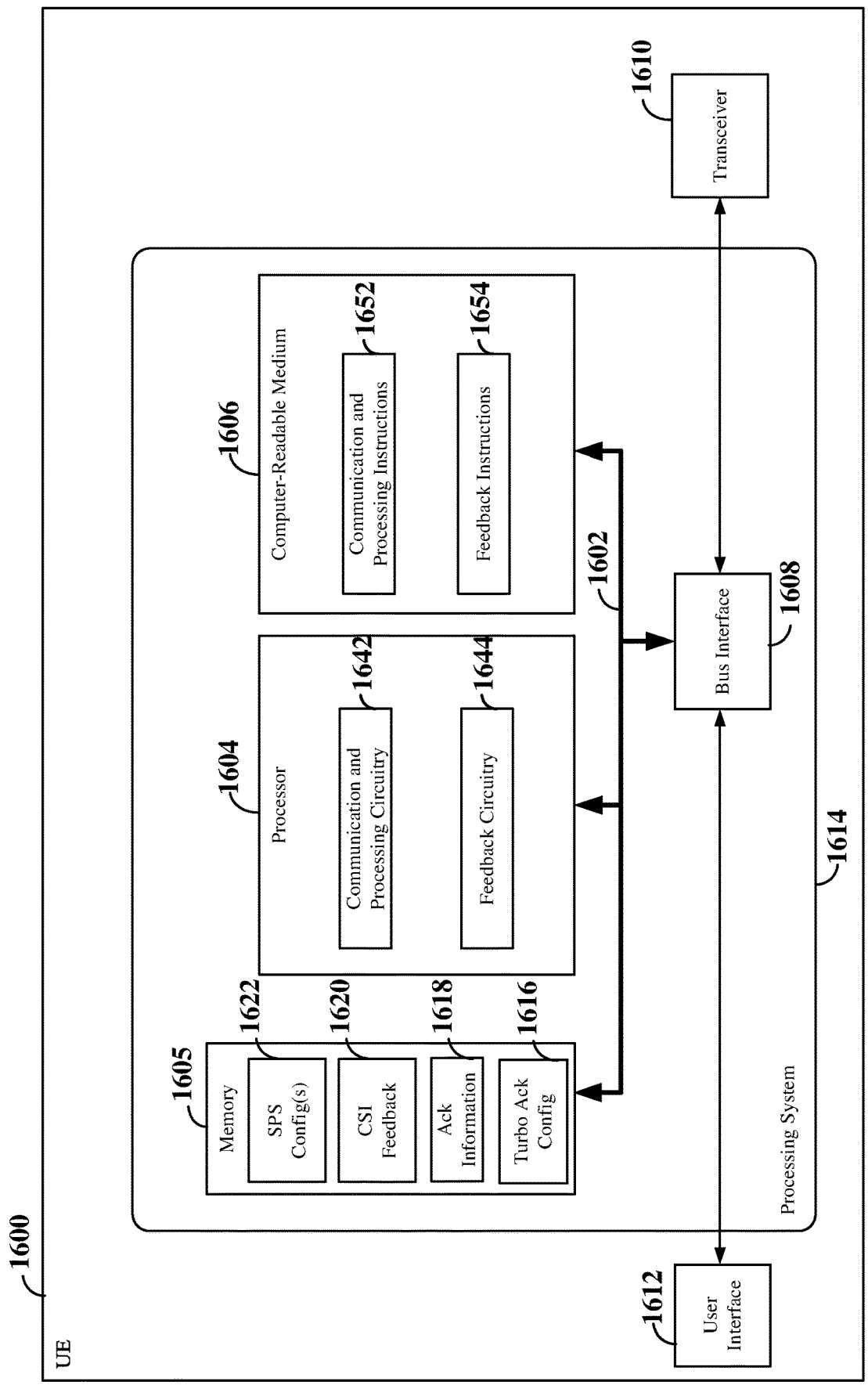
FIG. 16 is a block diagram illustrating an example of a hardware implementation for a UE employing a processing system according to some aspects.

FIG. 16 is a block diagram illustrating an example of a hardware implementation of a user equipment (UE) 1600 employing a processing system 1614 according to some aspects. The UE 1600 may be any of the UEs or other scheduled entities illustrated in any one or more of FIGS. 1, 2, 4, 5, 9, and/or 11-13.

In accordance with various aspects of the disclosure, an element, or any portion of an element, or any combination of elements may be implemented with a processing system 1614 that includes one or more processors, such as processor 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1600 may be configured to perform any one or more of the functions described herein. That is, the processor 1604, as utilized in the UE 1600, may be used to implement any one or more of the methods or processes described and illustrated, for example, in FIGS. 11-13, 17 and/or 18.

The processor 1604 may in some instances be implemented via a baseband or modem chip and in other implementations, the processor 1604 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits, including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, are not described any further.

A bus interface 1608 provides an interface between the bus 1602 and a transceiver 1610. The transceiver 1610 may be, for example, a wireless transceiver. The transceiver 1610 provides a means for communicating with various other apparatus over a transmission medium (e.g., air interface). The transceiver 1610 may further be coupled to one or more antennas/antenna arrays (not shown). The bus interface 1608 further provides an interface between the bus 1602 and a user interface 1612 (e.g., keypad, display, touch screen, speaker, microphone, control features, etc.). Of course, such a user interface 1612 may be omitted in some examples.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. In some examples, the computer-readable medium 1606 may be part of the memory 1605. Those skilled in the art will recognize how best to implement the described functionality presented throughout this disclosure depending on the particular application and the overall design constraints imposed on the overall system. In some examples, the computer-readable medium 1606 may be implemented on an article of manufacture, which may further include one or more other elements or circuits, such as the processor 1604 and/or memory 1605.

The computer-readable medium 1606 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1604, may be responsible for managing the bus 1602 and general processing, including the execution of the software (e.g., instructions or computer-executable code) stored on the computer-readable medium 1606. The software, when executed by the processor 1604, causes the processing system 1614 to perform the various processes and functions described herein for any particular apparatus. The computer-readable medium 1606 and/or the memory 1605 may also be used for storing data that may be manipulated by the processor 1604 when executing software. For example, the memory 1605 may store one or more of a turbo acknowledgement configuration 1616, acknowledgement information 1618, CSI feedback 1620, and one or more SPS configurations 1622.

In some aspects of the disclosure, the processor 1604 may include circuitry configured for various functions. For example, the processor 1604 may include communication and processing circuitry 1642 configured to communicate with a network entity (e.g., an aggregated or disaggregated base station, such as a gNB or eNB). In some examples, the communication and processing circuitry 1642 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1642 may include one or more transmit/receive chains. The communication and processing circuitry 1642 may further be configured to execute communication and processing software 1652 stored on the computer-readable medium 1606 to implement one or more functions described herein.

In some implementations where the communication involves receiving information, the communication and processing circuitry 1642 may obtain information from a component of the UE 1600 (e.g., from the transceiver 1610 that receives the information via radio frequency signaling or some other type of signaling suitable for the applicable communication medium), process (e.g., decode) the information, and output the processed information. For example, the communication and processing circuitry 1642 may output the information to another component of the processor 1604, to the memory 1605, or to the bus interface 1608. In some examples, the communication and processing circuitry 1642 may receive one or more of signals, messages, other information, or any combination thereof. In some examples, the communication and processing circuitry 1642 may receive information via one or more channels. In some examples, the communication and processing circuitry 1642 may include functionality for a means for receiving. In some examples, the communication and processing circuitry 1642 may include functionality for a means for processing, including a means for demodulating, a means for decoding, etc.

In some implementations where the communication involves sending (e.g., transmitting) information, the communication and processing circuitry 1642 may obtain information (e.g., from another component of the processor 1604, the memory 1605, or the bus interface 1608), process (e.g., modulate, encode, etc.) the information, and output the processed information. For example, the communication and processing circuitry 1642 may output the information to the transceiver 1610 (e.g., that transmits the information via radio frequency signaling or some other type of signaling suitable for the applicable communication medium). In some examples, the communication and processing circuitry 1642 may send one or more of signals, messages, other information, or any combination thereof. In some examples, the communication and processing circuitry 1642 may send information via one or more channels. In some examples, the communication and processing circuitry 1642 may include functionality for a means for sending (e.g., a means for transmitting). In some examples, the communication and processing circuitry 1642 may include functionality for a means for generating, including a means for modulating, a means for encoding, etc.

The communication and processing circuitry 1642 may further be configured to receive a plurality of packets from a network entity. In some examples, each of the plurality of packets may be associated with one or more SPS configuration 1622. For example, the communication and processing circuitry 1642 may be configured to receive the one or more SPS configuration 1622 and store the SPS configurations, for example, in memory 1605. The communication and processing circuitry 1642 may then be configured to receive downlink transmissions of PDSCH SPS occasions of a periodicity p, which defines the duration of time between two consecutive PDSCH SPS occasions. In some examples, the communication and processing circuitry 1642 may be configured to receive a single DCI scheduling each of the plurality of packets.

The communication and processing circuitry 1642 may further be configured to transmit acknowledgement information for each of the plurality of received packets to the network entity. For example, the communication and processing circuitry 1642 may be configured to transmit acknowledgement information based on a K1 parameter that is specified in the SPS configuration or in the DCI scheduling the plurality of packets. In some examples, the communication and processing circuitry 1642 may further be configured to transmit turbo acknowledgement information to the network entity including both acknowledgement information for a received packet and CSI feedback (e.g., a CSI report including one or more CSI values) generated based on the received packet to the network entity.

In various aspects, the communication and processing circuitry 1642 may further be configured to transmit combined acknowledgement information including respective first acknowledgement information (HARQ-ACK bits) for one or more packets of the plurality of received packets within an uplink resource and to further transmit turbo acknowledgement information including second acknowledgement information (HARQ-ACK bits) and CSI feedback for one or more remaining packets of the plurality of received packets within the same uplink resource. Thus, the communication and processing circuitry 1642 may be configured to multiplex the combined acknowledgement information and the turbo acknowledgement information onto the uplink resource.

In some examples, the communication and processing circuitry 1642 may be configured to receive a turbo acknowledgement configuration 1616 from the network entity and to store the turbo acknowledgement configuration 1616, for example, within the memory 1605. For example, the communication and processing circuitry 1642 may be configured to receive the turbo acknowledgement configuration 1616 within a MAC-CE or RRC message, within DCI scheduling the plurality of packets, or within DCI carrying an activation or reactivation of one or more SPS configurations 1622. The communication and processing circuitry 1642 may further be configured to execute communication and processing instructions (software) stored on the computer-readable medium 1606 to implement one or more of the functions described here.

The processor 1604 may further include feedback circuitry 1644, configured to generate acknowledgement information 1618 and CSI feedback 1620 based on the plurality of received packets. For example, the feedback circuitry 1644 may be configured to attempt decoding of each of the plurality of received packets and to generate acknowledgement information 1618 (e.g., an ACK or NACK) for each of the received packets indicating whether or not decoding of that received packet was successful. In addition, the feedback circuitry 1644 may further be configured to obtain respective CSI feedback 1620 (e.g., CSI values) for each of the plurality of packets. In some examples, based on the slot configuration of uplink/downlink slots/symbols in the network, an uplink resource may not be available at each K1 associated with each of the plurality of received packets. Therefore, the feedback circuitry 1644 may further store the acknowledgement information 1618 and CSI feedback 1620 within, for example, the memory 1605 until an uplink resource is available.

The feedback circuitry 1644 may further be configured to reduce the payload size of the CSI feedback 1620 multiplexed with the acknowledgement information 1618 in examples in which the feedback from the plurality of packets is deferred (e.g., due to an uplink resource not being available at each K1). For example, the feedback circuitry 1644 may be configured to operate together with the communication and processing circuitry 1642 to transmit the acknowledgement information 1618 for one or more packets of the plurality of packets and turbo acknowledgement information including both the acknowledgement information 1618 and CSI feedback 1620 for remaining packets of the plurality of packets. In some examples, the one or more remaining packets may include a single packet, such as a last packet of the plurality of packets. In other examples, the one or more remaining packets may include a plurality of remaining packets.

In some examples, the feedback circuitry 1644 may utilize the turbo acknowledgement configuration 1616 to identify a number of the plurality of remaining packets for which turbo acknowledgement information may be sent. For example, the turbo acknowledgement configuration may include a bitmap or a pattern indicating the number of the plurality of remaining packets. As an example, the turbo acknowledgement configuration 1616 may indicate that turbo acknowledgement information should be sent for the last X number of packets or for every other packet. As another example, the turbo acknowledgement configuration 1616 may indicate a time offset between consecutive ones of the plurality of remaining packets for which turbo acknowledgement information should be sent. As another example, the turbo acknowledgement configuration 1616 may indicate a respective number of the plurality of packets for each of the SPS configurations 1622.

In some examples, the feedback circuitry 1644 may generate absolute values for the CSI feedback 1620 for inclusion in the turbo acknowledgement information. In other examples, the feedback circuitry 1644 may generate compressed CSI feedback for inclusion in the turbo acknowledgement information. For example, the feedback circuitry 1644 may be configured to generate turbo acknowledgement information that includes absolute CSI values for at least one packet of the plurality of remaining packets and either an average CSI value for other packets of the plurality of remaining packets or differential CSI values with respect to the absolute CSI values for the other packets of the plurality of remaining packets. As another example, the feedback circuitry 1644 may be configured to generate turbo acknowledgement information that includes lowest absolute CSI values associated with at least one packet of the plurality of remaining packets. As another example, the feedback circuitry 1644 may be configured to generate turbo acknowledgement information including at least one of a mean, autocorrelation or auto-covariance of CSI reports associated with the plurality of remaining packets.

In some examples, the plurality of packets may include SPS occasions associated with two or more SPS configurations 1622. In this example, the feedback circuitry 1644 may further be configured to generate the turbo acknowledgement information including respective CSI feedback 1620 (e.g., a respective CSI report) for each of the two or more SPS configurations in an order of the two or more SPS configurations. In some examples, each of the two or more SPS configurations may include a respective SPS priority. In this example, the feedback circuitry 1644 may generate the turbo acknowledgement information including respective CSI feedback 1620 (e.g., a respective CSI report) for each of the SPS priorities of the two or more SPS configurations. The feedback circuitry 1644 may further be configured to execute feedback instructions (software) 1654 stored on the computer-readable medium 1606 to implement one or more functions described herein.

Figure 17:
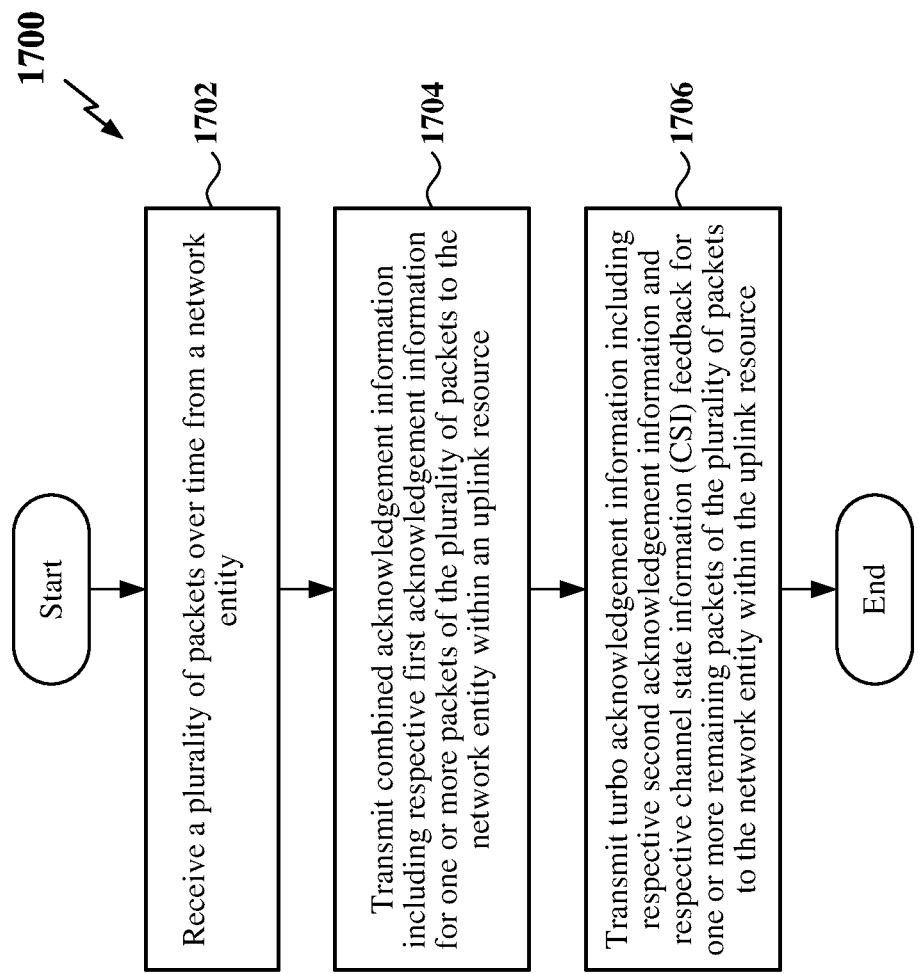
FIG. 17 is a flow chart of an exemplary method for CSI feedback reduction for deferred feedback at a UE according to some aspects.

FIG. 17 is a flow chart illustrating an exemplary process 1700 for CSI feedback reduction for deferred feedback according to some aspects. As described below, some or all illustrated features may be omitted in a particular implementation within the scope of the present disclosure, and some illustrated features may not be required for implementation of all embodiments. In some examples, the process 1700 may be carried out by the UE 1600 illustrated in FIG. 16. In some examples, the process 1700 may be carried out by any suitable apparatus or means for carrying out the functions or algorithm described below.

At block 1702, the UE may receive a plurality of packets over time from a network entity. For example, the UE may receive the plurality of packets in accordance with one or more SPS configurations. As another example, the UE may receive plurality of packets based on a DCI scheduling the plurality of packets. For example, the communication and processing circuitry 1642 together with the transceiver 1610 shown and described above in connection with FIG. 16 may provide a means to receive the plurality of packets.

At block 1704, the UE may transmit combined acknowledgement information including respective first acknowledgement information for one or more packets of the plurality of packets to the network entity within an uplink resource. For example, the communication and processing circuitry 1642, together with the feedback circuitry 1644 and transceiver 1610, shown and described above in connection with FIG. 16 may provide a means to transmit the combined acknowledgement information.

At block 1706, the UE may transmit turbo acknowledgement information including respective second acknowledgement information and respective channel state information (CSI) feedback for one or more remaining packets of the plurality of packets to the network entity within the uplink resource. In some examples, the one or more remaining packets include a single packet of the plurality of packets. In some examples, the single packet is a last received packet of the plurality of packets. In some examples, the one or more remaining packets include a plurality of remaining packets. For example, the plurality of remaining packets may include a given number of last received packets of the plurality of remaining packets. As another example, the plurality of remaining packets may be based on a bitmap, pattern, or time offset associated with the plurality of packets. In some examples, the plurality of remaining packets may include a respective number of the plurality of remaining packets for each of two or more SPS configurations.

In some examples, the turbo acknowledgement information includes absolute CSI values for at least one packet of the plurality of remaining packets and either an average CSI value for other packets of the plurality of remaining packets or differential CSI values with respect to the absolute CSI values for the other packets of the plurality of remaining packets. In some examples, the turbo acknowledgement information includes lowest absolute CSI values associated with at least one packet of the plurality of remaining packets. In some examples, the turbo acknowledgement information includes at least one of a mean, autocorrelation or auto-covariance of CSI reports associated with the plurality of remaining packets. In some examples, the turbo acknowledgement information includes a respective CSI report for each of the two or more SPS configurations in an order of the two or more SPS configurations. In some examples, each of the two or more SPS configurations includes a respective SPS priority. In this example, the turbo acknowledgement information includes a respective CSI report for each of the SPS priorities of the two or more SPS configurations. For example, the communication and processing circuitry 1642, together with the feedback circuitry 1644 and transceiver 1610, shown and described above in connection with FIG. 16 may provide a means to transmit the turbo acknowledgement information.

Figure 18:
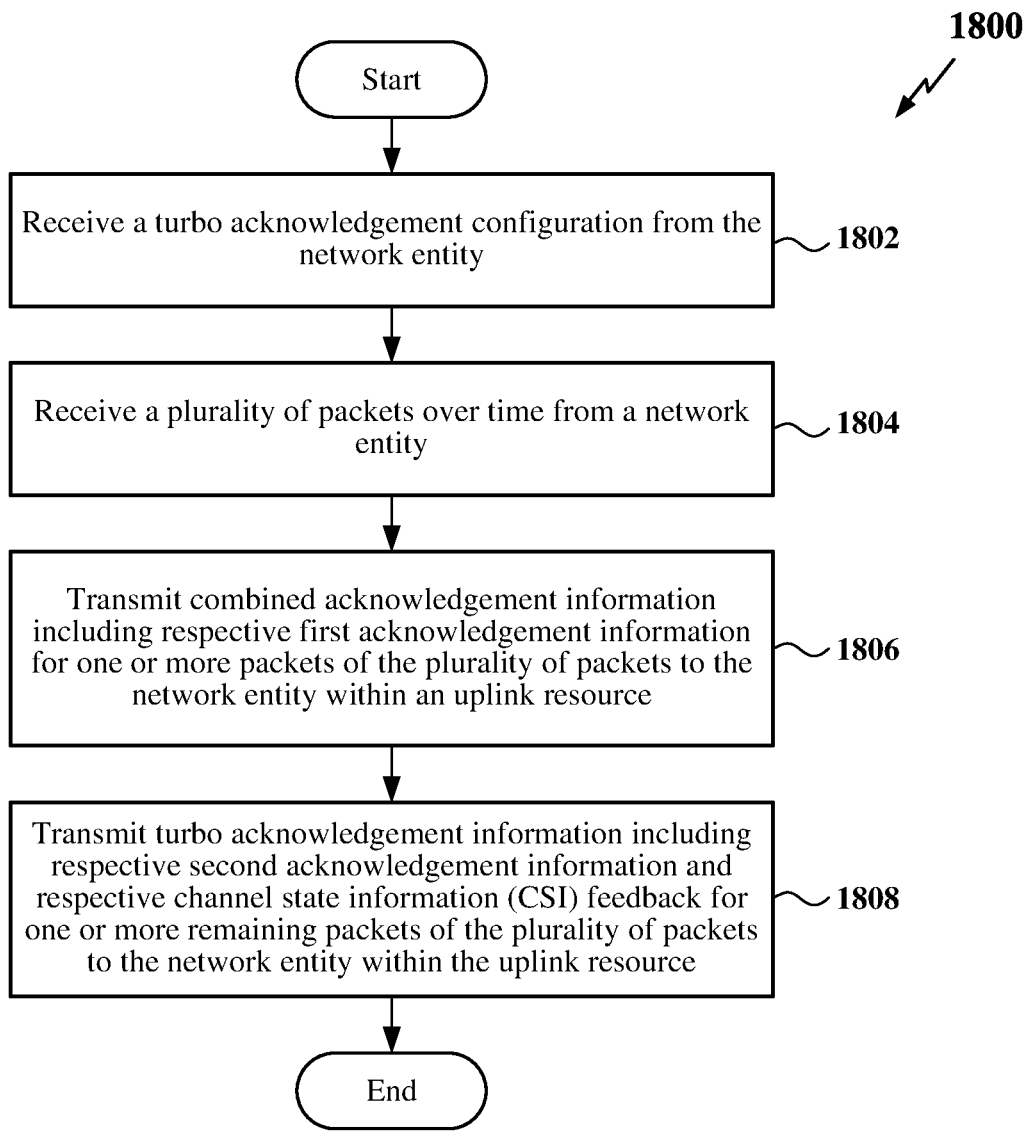
FIG. 18 is a flow chart of another exemplary method for CSI feedback reduction for deferred feedback at a UE according to some aspects.

FIG. 18 is a flow chart illustrating an exemplary process 1800 for CSI feedback reduction for deferred feedback according to some aspects. As described below, some or all illustrated features may be omitted in a particular implementation within the scope of the present disclosure, and some illustrated features may not be required for implementation of all embodiments. In some examples, the process 1800 may be carried out by the UE 1600 illustrated in FIG. 16. In some examples, the process 1800 may be carried out by any suitable apparatus or means for carrying out the functions or algorithm described below.

At block 1802, the UE may receive a turbo acknowledgement configuration from a network entity. In some examples, the UE may receive a medium access control (MAC) control element (MAC-CE) or radio resource control message including the turbo acknowledgement configuration. In some examples, the UE may receive downlink control information scheduling a plurality of packets. In this example, the downlink control information may further include the turbo acknowledgement configuration. In some examples, the plurality of packets may include semi-persistently scheduled (SPS) occasions associated with two or more SPS configurations. In this example, the UE may receive downlink control information including an activation or reactivation of the two or more SPS configurations and the turbo acknowledgement configuration. For example, the communication and processing circuitry 1642, together with the feedback circuitry 1644 and the transceiver 1610, shown and described above in connection with FIG. 16 may provide a means to receive the turbo acknowledgement configuration.

At block 1804, the UE may receive a plurality of packets over time from the network entity. For example, the UE may receive the plurality of packets in accordance with one or more SPS configurations. As another example, the UE may receive the plurality of packets based on a DCI scheduling the plurality of packets. For example, the communication and processing circuitry 1642 together with the transceiver 1610 shown and described above in connection with FIG. 16 may provide a means to receive the plurality of packets.

At block 1806, the UE may transmit combined acknowledgement information including respective first acknowledgement information for one or more packets of the plurality of packets to the network entity within an uplink resource. For example, the communication and processing circuitry 1642, together with the feedback circuitry 1644 and transceiver 1610, may provide a means to transmit the combined acknowledgement information.

At block 1808, the UE may transmit turbo acknowledgement information including respective second acknowledgement information and respective channel state information (CSI) feedback for one or more remaining packets of the plurality of packets to the network entity within the uplink resource based on the turbo acknowledgement configuration. In some examples, the one or more remaining packets include a single packet of the plurality of packets. In some examples, the single packet is a last received packet of the plurality of packets. In some examples, the one or more remaining packets include a plurality of remaining packets. For example, the turbo acknowledgement configuration may indicate a number of the plurality of remaining packets. In some examples, the number of the plurality of remaining packets may include a given number of last received packets of the plurality of remaining packets. In some examples, the turbo acknowledgement configuration includes a bitmap or pattern indicating the number of the plurality of remaining packets. In some examples, the turbo acknowledgement configuration may indicate a respective number of the plurality of remaining packets for each of two or more SPS configurations. In some examples, the turbo acknowledgement information may indicate a time offset between consecutive ones of the plurality of remaining packets.

In some examples, the turbo acknowledgement information includes absolute CSI values for at least one packet of the plurality of remaining packets and either an average CSI value for other packets of the plurality of remaining packets or differential CSI values with respect to the absolute CSI values for the other packets of the plurality of remaining packets. In some examples, the turbo acknowledgement information includes lowest absolute CSI values associated with at least one packet of the plurality of remaining packets. In some examples, the turbo acknowledgement information includes at least one of a mean, autocorrelation or autocovariance of CSI reports associated with the plurality of remaining packets. In some examples, the turbo acknowledgement information includes a respective CSI report for each of the two or more SPS configurations in an order of the two or more SPS configurations. In some examples, each of the two or more SPS configurations includes a respective SPS priority. In this example, the turbo acknowledgement information includes a respective CSI report for each of the SPS priorities of the two or more SPS configurations. For example, the communication and processing circuitry 1642, together with the feedback circuitry 1644 and transceiver, shown and described above in connection with FIG. 16 may provide a means to transmit the turbo acknowledgement information.

In one configuration, the UE includes means for receiving a plurality of packets over time from a network entity, means for transmitting combined acknowledgement information including respective first acknowledgement information for one or more packets of the plurality of packets to the network entity within an uplink resource, and means for transmitting turbo acknowledgement information including respective second acknowledgement information and respective channel state information (CSI) feedback for one or more remaining packets of the plurality of packets to the network entity within the uplink resource. In one aspect, the aforementioned means may be the processor 1904 shown in FIG. 19 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, 4, 5, 9, and/or 11-13, and utilizing, for example, the processes and/or algorithms described herein in relation to FIGS. 11-13, 17 and 18.

Figure 19:
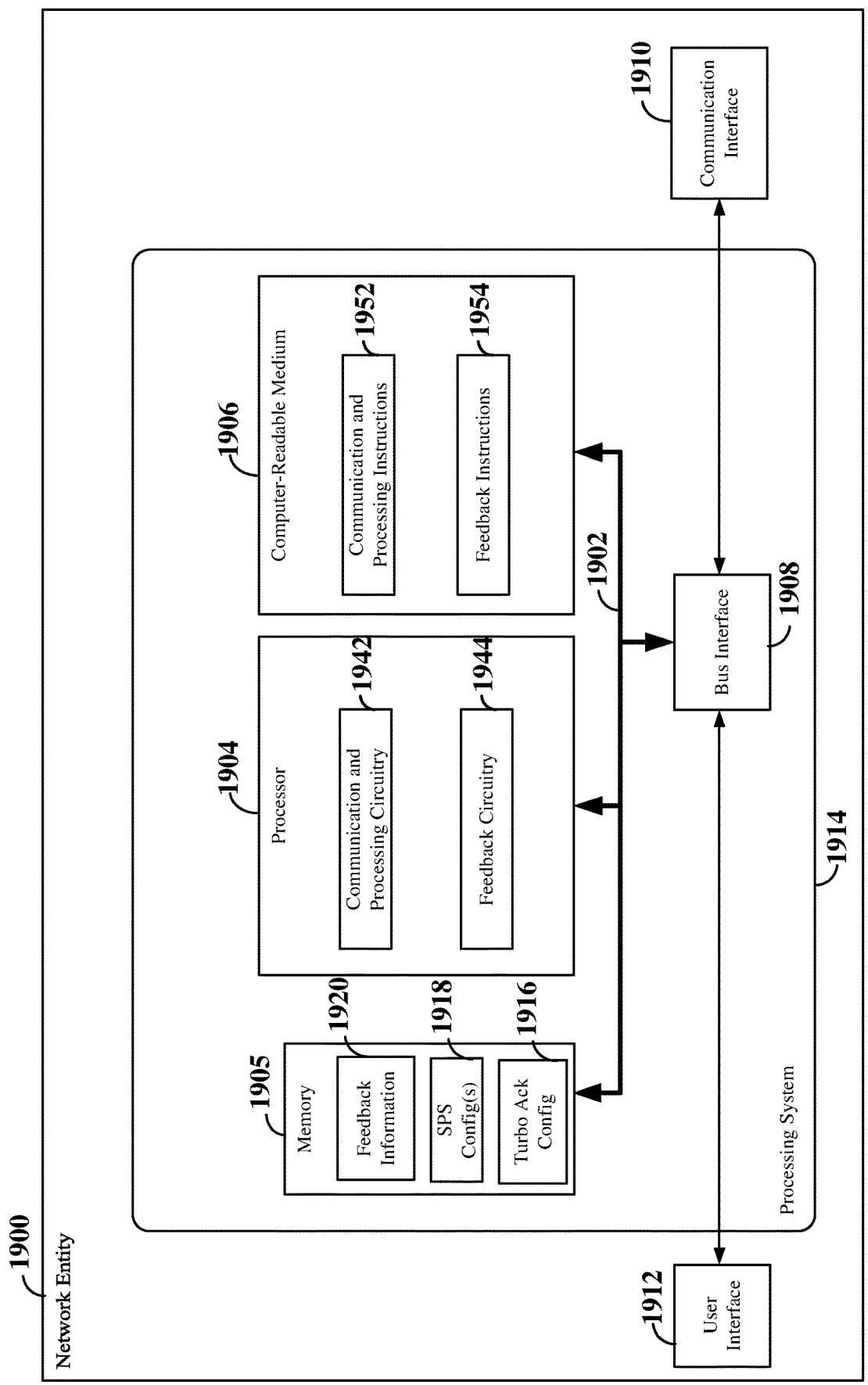
FIG. 19 is a block diagram illustrating an example of a hardware implementation for a network entity employing a processing system according to some aspects.

FIG. 19 is a block diagram illustrating an example of a hardware implementation of a network entity 1900 employing a processing system 1914 according to some aspects. The network entity 1900 may be, for example, any base station (e.g., gNB, eNB) or other scheduling entity as illustrated in any one or more of FIGS. 1, 2, 4, 5, 9, and/or 11-13. The network entity 1900 may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

In accordance with various aspects of the disclosure, an element, or any portion of an element, or any combination of elements may be implemented with a processing system 1914 that includes one or more processors, such as processor 1904. The processing system 1914 may be substantially the same as the processing system 1614 as shown and described above in connection with FIG. 16, including a bus interface 1908, a bus 1902, a memory 1905, a processor 1904, and a computer-readable medium 1906. Accordingly, their descriptions will not be repeated for the sake of brevity. Furthermore, the network entity 1900 may include an optional user interface 1912 and a transceiver 1910.

The processor 1904, as utilized in the network entity 1900, may be used to implement any one or more of the processes described below. In some examples, the memory 1905 may store a turbo acknowledgement configuration 1916, one or more SPS configurations 1918, and/or feedback information 1920 for use by the processor 1904 when executing software (instructions) stored on the computer-readable medium 1906.

In some aspects of the disclosure, the processor 1904 may include communication and processing circuitry 1942 configured for various functions, including, for example, communicating with one or more UEs or other scheduled entities. In some examples (e.g., in an aggregated base station architecture), the communication and processing circuitry 1942 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1942 may be configured to process and transmit downlink traffic (e.g., packets) and downlink control and receive and process uplink traffic (e.g., packets) and uplink control.

The communication and processing circuitry 1942 may further be configured to transmit a plurality of packets over time to a UE. For example, the communication and processing circuitry 1942 may be configured to transmit the plurality of packets based on one or more SPS configurations 1918 configured for the UE. As another example, the communication and processing circuitry 1942 may be configured to transmit the plurality of packets in accordance with DCI transmitted to the UE scheduling the plurality of packets.

The communication and processing circuitry 1942 may further be configured to receive combined acknowledgement information including respective first acknowledgement information (HARQ-ACK bits) for one or more packets of the plurality of received packets within an uplink resource and to further receive turbo acknowledgement information including second acknowledgement information (HARQ-ACK bits) and CSI feedback for one or more remaining packets of the plurality of received packets within the same uplink resource. The received combined acknowledgement information and received turbo acknowledgement information may collectively form the feedback information 1920 that may be stored, for example, in memory 1905. In some examples, the communication and processing circuitry 1942 may be configured to transmit a turbo acknowledgement configuration 1916 to the UE. For example, the communication and processing circuitry 1942 may be configured to transmit the turbo acknowledgement configuration 1916 within a MAC-CE or RRC message, within DCI scheduling the plurality of packets, or within DCI carrying an activation or reactivation of one or more SPS configurations 1918. The communication and processing circuitry 1942 may further be configured to execute communication and processing instructions (software) 1952 stored on the computer-readable medium 1906 to implement one or more functions described herein.

The processor 1904 may further include feedback circuitry 1944, configured to receive and process the feedback information 1920 including the combined acknowledgement information and the turbo acknowledgement information.

For example, the turbo acknowledgement information may include absolute values for the CSI feedback. In other examples, the turbo acknowledgement information may include compressed CSI feedback. For example, the turbo acknowledgement information may include absolute CSI values for at least one packet of the plurality of remaining packets and either an average CSI value for other packets of the plurality of remaining packets or differential CSI values with respect to the absolute CSI values for the other packets of the plurality of remaining packets. As another example, the turbo acknowledgement information may include includes lowest absolute CSI values associated with at least one packet of the plurality of remaining packets. As another example, the turbo acknowledgement information may include at least one of a mean, autocorrelation or autocovariance of CSI reports associated with the plurality of remaining packets.

In some examples, the plurality of packets may include SPS occasions associated with two or more SPS configurations 1918. In this example, the turbo acknowledgement information may include respective CSI feedback (e.g., a respective CSI report) for each of the two or more SPS configurations in an order of the two or more SPS configurations. In some examples, each of the two or more SPS configurations may include a respective SPS priority. In this example, the turbo acknowledgement information including respective CSI feedback (e.g., a respective CSI report) for each of the SPS priorities of the two or more SPS configurations In addition, the feedback circuitry 1944 may be configured to generate the turbo acknowledgement configuration 1916. In some examples, the turbo acknowledgement configuration 1916 indicates a number of the remaining packets to include in the turbo acknowledgement information. For example, the turbo acknowledgement configuration 1916 may include a bitmap or a pattern indicating the number of the plurality of remaining packets. As an example, the turbo acknowledgement configuration 1916 may indicate that turbo acknowledgement information should be sent for the last X number of packets or for every other packet. As another example, the turbo acknowledgement configuration 1916 may indicate a time offset between consecutive ones of the plurality of remaining packets for which turbo acknowledgement information should be sent. As another example, the turbo acknowledgement configuration 1916 may indicate a respective number of the plurality of packets for each of the SPS configurations 1918. The feedback circuitry 1944 may further be configured to execute feedback instructions (software) 1954 to implement one or more of the functions described herein.

Figure 20:
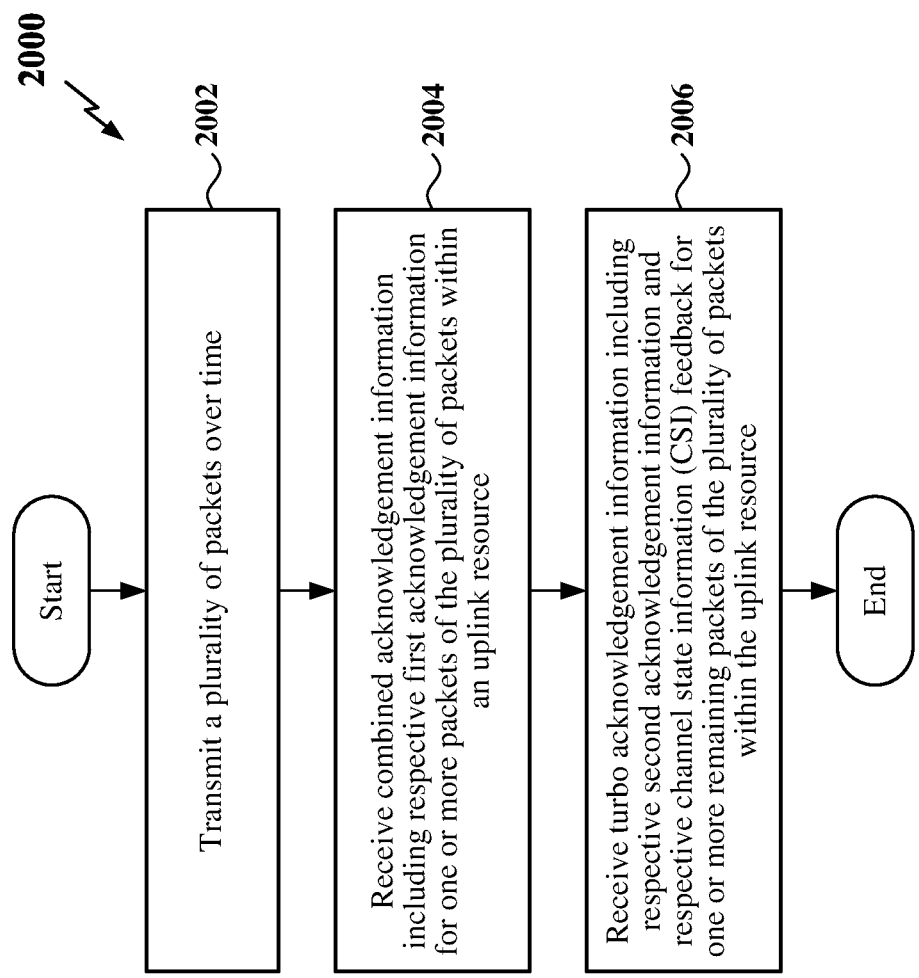
FIG. 20 is a flow chart of an exemplary method for CSI feedback reduction for deferred feedback at a network entity according to some aspects.

FIG. 20 is a flow chart illustrating an exemplary process 2000 for CSI feedback reduction for deferred feedback according to some aspects. As described below, some or all illustrated features may be omitted in a particular implementation within the scope of the present disclosure, and some illustrated features may not be required for implementation of all embodiments. In some examples, the process 2000 may be carried out by the network entity 1900 illustrated in FIG. 19. In some examples, the process 2000 may be carried out by any suitable apparatus or means for carrying out the functions or algorithm described below.

At block 2002, the network entity may transmit a plurality of packets over time. For example, the network entity may transmit the plurality of packets in accordance with one or more SPS configurations. As another example, the network entity may transmit the plurality of packets based on a DCI scheduling the plurality of packets. For example, the communication and processing circuitry 1942 together with the transceiver 1910 shown and described above in connection with FIG. 19 may provide a means to transmit the plurality of packets.

At block 2004, the network entity may receive combined acknowledgement information including respective first acknowledgement information for one or more packets of the plurality of packets within an uplink resource. For example, the communication and processing circuitry 1942, together with the feedback circuitry 1944 and transceiver 1910, shown and described above in connection with FIG. 19 may provide a means to receive the combined acknowledgement information.

At block 2006, the network entity may receive turbo acknowledgement information including respective second acknowledgement information and respective channel state information (CSI) feedback for one or more remaining packets of the plurality of packets within the uplink resource. In some examples, the one or more remaining packets include a single packet of the plurality of packets. In some examples, the single packet is a last received packet of the plurality of packets. In some examples, the one or more remaining packets include a plurality of remaining packets. For example, the plurality of remaining packets may include a given number of last received packets of the plurality of remaining packets. As another example, the plurality of remaining packets may be based on a bitmap, pattern, or time offset associated with the plurality of packets. In some examples, the plurality of remaining packets may include a respective number of the plurality of remaining packets for each of two or more SPS configurations.

In some examples, the turbo acknowledgement information includes absolute CSI values for at least one packet of the plurality of remaining packets and either an average CSI value for other packets of the plurality of remaining packets or differential CSI values with respect to the absolute CSI values for the other packets of the plurality of remaining packets. In some examples, the turbo acknowledgement information includes lowest absolute CSI values associated with at least one packet of the plurality of remaining packets. In some examples, the turbo acknowledgement information includes at least one of a mean, autocorrelation or autocovariance of CSI reports associated with the plurality of remaining packets. In some examples, the turbo acknowledgement information includes a respective CSI report for each of the two or more SPS configurations in an order of the two or more SPS configurations. In some examples, each of the two or more SPS configurations includes a respective SPS priority. In this example, the turbo acknowledgement information includes a respective CSI report for each of the SPS priorities of the two or more SPS configurations. For example, the communication and processing circuitry 1942, together with the feedback circuitry 1944 and transceiver 1910, shown and described above in connection with FIG. 19 may provide a means to receive the turbo acknowledgement information.

Figure 21:
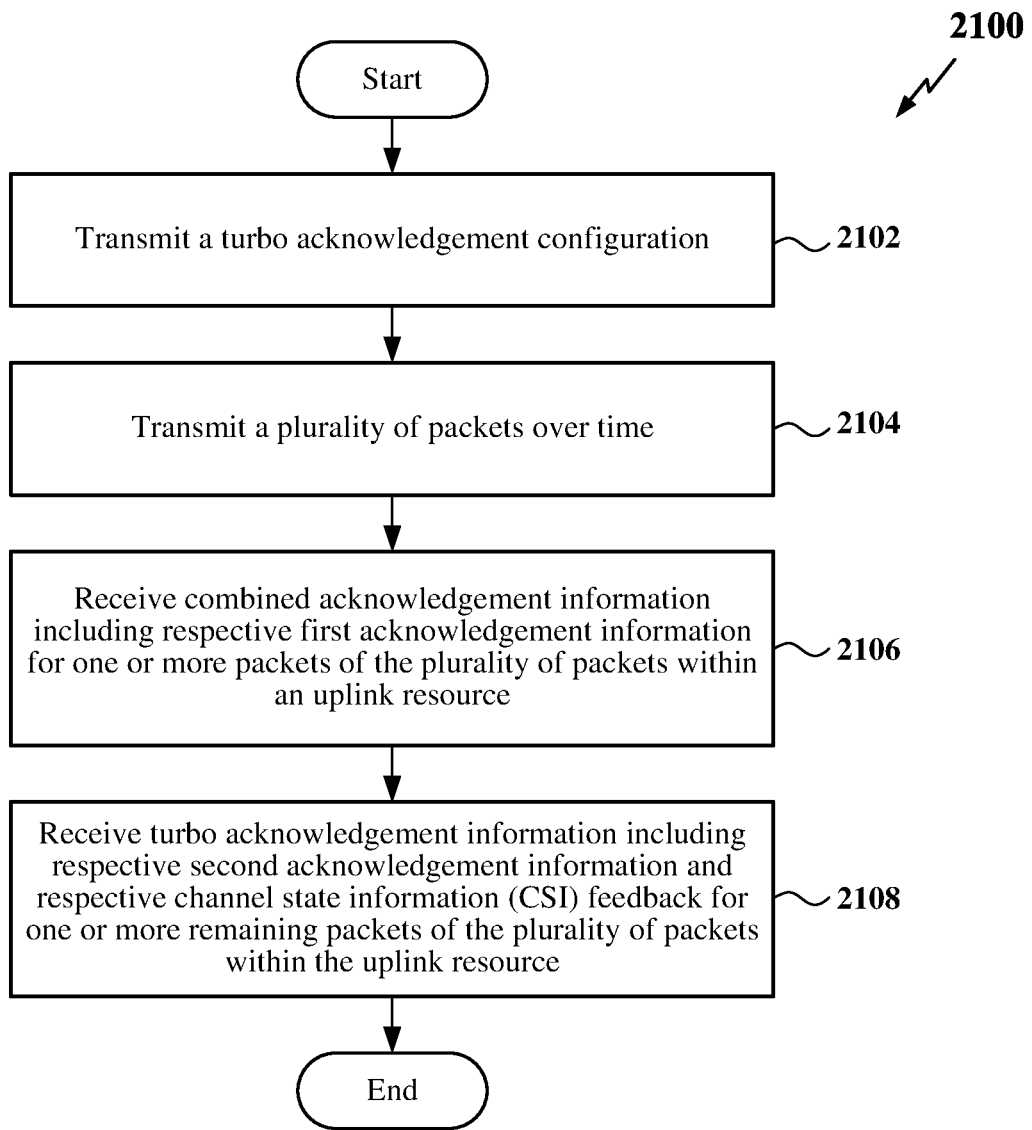
FIG. 21 is a flow chart of another exemplary method for CSI feedback reduction for deferred feedback at a network entity according to some aspects.

FIG. 21 is a flow chart illustrating an exemplary process 2100 for CSI feedback reduction for deferred feedback according to some aspects. As described below, some or all illustrated features may be omitted in a particular implementation within the scope of the present disclosure, and some illustrated features may not be required for implementation of all embodiments. In some examples, the process 2100 may be carried out by the network entity 1900 illustrated in FIG. 19. In some examples, the process 2100 may be carried out by any suitable apparatus or means for carrying out the functions or algorithm described below.

At block 2102, the network entity may generate and transmit a turbo acknowledgement configuration. In some examples, the network entity may transmit a medium access control (MAC) control element (MAC-CE) or radio resource control message including the turbo acknowledgement configuration. In some examples, the network entity may transmit downlink control information scheduling a plurality of packets. In this example, the downlink control information may further include the turbo acknowledgement configuration. In some examples, the plurality of packets may include semi-persistently scheduled (SPS) occasions associated with two or more SPS configurations. In this example, the network entity may transmit downlink control information including an activation or reactivation of the two or more SPS configurations and the turbo acknowledgement configuration. For example, the communication and processing circuitry 1942, together with the feedback circuitry 1944 and the transceiver 1910, shown and described above in connection with FIG. 19 may provide a means to transmit the turbo acknowledgement configuration.

At block 2104, the network entity may transmit a plurality of packets over time. For example, the network entity may transmit the plurality of packets in accordance with one or more SPS configurations. As another example, the network entity may transmit the plurality of packets based on a DCI scheduling the plurality of packets. For example, the communication and processing circuitry 1942 together with the transceiver 1910 shown and described above in connection with FIG. 19 may provide a means to transmit the plurality of packets.

At block 2106, the network entity may receive combined acknowledgement information including respective first acknowledgement information for one or more packets of the plurality of packets within an uplink resource. For example, the communication and processing circuitry 1942, together with the feedback circuitry 1944 and transceiver 1910, may provide a means to receive the combined acknowledgement information.

At block 2108, the network entity may receive turbo acknowledgement information including respective second acknowledgement information and respective channel state information (CSI) feedback for one or more remaining packets of the plurality of packets within the uplink resource based on the turbo acknowledgement configuration. In some examples, the one or more remaining packets include a single packet of the plurality of packets. In some examples, the single packet is a last received packet of the plurality of packets. In some examples, the one or more remaining packets include a plurality of remaining packets. For example, the turbo acknowledgement configuration may indicate a number of the plurality of remaining packets. In some examples, the number of the plurality of remaining packets may include a given number of last received packets of the plurality of remaining packets. In some examples, the turbo acknowledgement configuration includes a bitmap or pattern indicating the number of the plurality of remaining packets. In some examples, the turbo acknowledgement configuration may indicate a respective number of the plurality of remaining packets for each of two or more SPS configurations. In some examples, the turbo acknowledgement information may indicate a time offset between consecutive ones of the plurality of remaining packets.

In some examples, the turbo acknowledgement information includes absolute CSI values for at least one packet of the plurality of remaining packets and either an average CSI value for other packets of the plurality of remaining packets or differential CSI values with respect to the absolute CSI values for the other packets of the plurality of remaining packets. In some examples, the turbo acknowledgement information includes lowest absolute CSI values associated with at least one packet of the plurality of remaining packets. In some examples, the turbo acknowledgement information includes at least one of a mean, autocorrelation or autocovariance of CSI reports associated with the plurality of remaining packets. In some examples, the turbo acknowledgement information includes a respective CSI report for each of the two or more SPS configurations in an order of the two or more SPS configurations. In some examples, each of the two or more SPS configurations includes a respective SPS priority. In this example, the turbo acknowledgement information includes a respective CSI report for each of the SPS priorities of the two or more SPS configurations. For example, the communication and processing circuitry 1942, together with the feedback circuitry 1944 and transceiver, shown and described above in connection with FIG. 19 may provide a means to receive the turbo acknowledgement information.

In one configuration, the network entity includes means for transmitting a plurality of packets over time, means for receiving combined acknowledgement information including respective first acknowledgement information for one or more packets of the plurality of packets within an uplink resource, and means for receiving turbo acknowledgement information including respective second acknowledgement information and respective channel state information (CSI) feedback for one or more remaining packets of the plurality of packets within the uplink resource. In one aspect, the aforementioned means may be the processor 1904 shown in FIG. 19 configured to perform the functions recited by the aforementioned means. In another aspect, the aforementioned means may be a circuit or any apparatus configured to perform the functions recited by the aforementioned means.

Of course, in the above examples, the circuitry included in the processor 1904 is merely provided as an example, and other means for carrying out the described functions may be included within various aspects of the present disclosure, including but not limited to the instructions stored in the computer-readable storage medium 1906, or any other suitable apparatus or means described in any one of the FIGS. 1, 2, 4, 5, 9, and/or 11-13, and utilizing, for example, the processes and/or algorithms described herein in relation to FIGS. 11-13, 20 and 21.

The following provides an overview of aspects of the present disclosure:

Aspect 1: A method for wireless communication at a user equipment (UE), the method comprising: receiving a plurality of packets over time from a network entity; transmitting combined acknowledgement information comprising respective first acknowledgement information for one or more packets of the plurality of packets to the network entity within an uplink resource; and transmitting turbo acknowledgement information comprising respective second acknowledgement information and respective channel state information (CSI) feedback for one or more remaining packets of the plurality of packets to the network entity within the uplink resource.

Aspect 2: The method of aspect 1, wherein the one or more remaining packets comprise a single packet of the plurality of packets.

Aspect 3: The method of aspect 2, wherein the single packet is a last received packet of the plurality of packets.

Aspect 4: The method of aspect 1, wherein the one or more remaining packets comprises a plurality of remaining packets.

Aspect 5: The method of aspect 4, further comprising: receiving a turbo acknowledgement configuration indicating a number of the plurality of remaining packets from the network entity.

Aspect 6: The method of aspect 5, wherein the number of the plurality of remaining packets is a given number of last received packets of the plurality of packets.

Aspect 7: The method of aspect 5, wherein the turbo acknowledgement configuration comprises a bitmap or pattern indicating the number of the plurality of remaining packets.

Aspect 8: The method of any of aspects 5 through 7, wherein the receiving the turbo acknowledgement configuration further comprises: receiving a medium access control (MAC) control element (MAC-CE) or radio resource control message comprising the turbo acknowledgment configuration.

Aspect 9: The method of any of aspects 5 through 7, wherein the receiving the turbo acknowledgement configuration further comprises: receiving downlink control information scheduling the plurality of packets, the downlink control information further comprising the turbo acknowledgement configuration.

Aspect 10: The method of any of aspects 5 through 7, wherein the plurality of packets comprise semi-persistently scheduled (SPS) occasions associated with two or more SPS configurations, and wherein the receiving the turbo acknowledgement configuration further comprises: receiving downlink control information comprising an activation or reactivation of the two or more SPS configurations and the turbo acknowledgement configuration.

Aspect 11: The method of aspect 10, wherein the turbo acknowledgement configuration indicates a respective number of the plurality of remaining packets for each of the two or more SPS configurations.

Aspect 12: The method of any of aspects 4 through 11, wherein the turbo acknowledgement information indicates a time offset between consecutive ones of the plurality of remaining packets.

Aspect 13: The method of any of aspects 4 through 11, wherein the turbo acknowledgement information comprises absolute CSI values for at least one packet of the plurality of remaining packets and either an average CSI value for other packets of the plurality of remaining packets or differential CSI values with respect to the absolute CSI values for the other packets of the plurality of remaining packets.

Aspect 14: The method of any of aspects 4 through 11, wherein the turbo acknowledgement information comprises lowest absolute CSI values associated with at least one packet of the plurality of remaining packets.

Aspect 15: The method of any of aspects 4 through 11, wherein the turbo acknowledgement information comprises at least one of a mean, autocorrelation or auto-covariance of CSI reports associated with the plurality of remaining packets.

Aspect 16: The method of any of aspects 4 through 11, wherein the plurality of packets comprise semi-persistently scheduled (SPS) occasions associated with two or more SPS configurations.

Aspect 17: The method of aspect 16, wherein the turbo acknowledgement information comprises a respective CSI report for each of the two or more SPS configurations in an order of the two or more SPS configurations.

Aspect 18: The method of aspect 16, wherein each of the two or more SPS configurations comprises a respective SPS priority, and the turbo acknowledgement information comprises a respective CSI report for each of the SPS priorities of the two or more SPS configurations.

Aspect 19: A UE comprising a transceiver, a memory, and a processor coupled to the transceiver and the memory, the processor and the memory configured to perform a method of any one of aspects 1 through 18.

Aspect 20: A UE comprising means for performing a method of any one of aspects 1 through 18.

Aspect 21: An article of manufacture comprising a non-transitory computer-readable medium having stored therein instructions executable by one or more processors of a UE to perform a method of any one of aspects 1 through 18.

Aspect 22: A method for wireless communication at a network entity, comprising: transmitting a plurality of packets over time; receiving combined acknowledgement information comprising respective first acknowledgement information for one or more packets of the plurality of packets within an uplink resource; and receiving turbo acknowledgement information comprising respective second acknowledgement information and respective channel state information (CSI) feedback for one or more remaining packets of the plurality of packets within the uplink resource.

Aspect 23: The method of aspect 22, wherein the one or more remaining packets comprise a single packet of the plurality of packets.

Aspect 24: The method of aspect 23, wherein the single packet is a last received packet of the plurality of packets.

Aspect 25: The method of aspect 22, wherein the one or more remaining packets comprises a plurality of remaining packets.

Aspect 26: The method of aspect 25, further comprising: transmitting a turbo acknowledgement configuration indicating a number of the plurality of remaining packets from the network entity.

Aspect 27: The method of aspect 26, wherein the number of the plurality of remaining packets is a given number of last received packets of the plurality of packets.

Aspect 28: The method of aspect 26, wherein the turbo acknowledgement configuration comprises a bitmap or pattern indicating the number of the plurality of remaining packets.

Aspect 29: The method of any of aspects 26 through 28, wherein the transmitting the turbo acknowledgement configuration further comprises: transmitting a medium access control (MAC) control element (MAC-CE) or radio resource control message comprising the turbo acknowledgment configuration.

Aspect 30: The method of any of aspects 26 through 28, wherein the transmitting the turbo acknowledgement configuration further comprises: transmitting downlink control information scheduling the plurality of packets, the downlink control information further comprising the turbo acknowledgement configuration.

Aspect 31: The method of any of aspects 26 through 28, wherein the plurality of packets comprise semi-persistently scheduled (SPS) occasions associated with two or more SPS configurations, and wherein the transmitting the turbo acknowledgement configuration further comprises: transmitting downlink control information comprising an activation or reactivation of the two or more SPS configurations and the turbo acknowledgement configuration.

Aspect 32: The method of aspect 31, wherein the turbo acknowledgement configuration indicates a respective number of the plurality of remaining packets for each of the two or more SPS configurations.

Aspect 33: The method of any of aspects 25 through 32, wherein the turbo acknowledgement information indicates a time offset between consecutive ones of the plurality of remaining packets.

Aspect 34: The method of any of aspects 25 through 32, wherein the turbo acknowledgement information comprises absolute CSI values for at least one packet of the plurality of remaining packets and either an average CSI value for other packets of the plurality of remaining packets or differential CSI values with respect to the absolute CSI values for the other packets of the plurality of remaining packets.

Aspect 35: The method of any of aspects 25 through 32, wherein the turbo acknowledgement information comprises lowest absolute CSI values associated with at least one packet of the plurality of remaining packets.

Aspect 36: The method of any of aspects 25 through 32, wherein the turbo acknowledgement information comprises at least one of a mean, autocorrelation or auto-covariance of CSI reports associated with the plurality of remaining packets.

Aspect 37: The method of any of aspects 25 through 32, wherein the plurality of packets comprise semi-persistently scheduled (SPS) occasions associated with two or more SPS configurations.

Aspect 38: The method of aspect 37, wherein the turbo acknowledgement information comprises a respective CSI report for each of the two or more SPS configurations in an order of the two or more SPS configurations.

Aspect 39: The method of aspect 37, wherein each of the two or more SPS configurations comprises a respective SPS priority, and the turbo acknowledgement information comprises a respective CSI report for each of the SPS priorities of the two or more SPS configurations.

Aspect 40: A network entity comprising a memory and a processor coupled to the memory, the processor and the memory configured to perform a method of any one of aspects 22 through 39.

Aspect 41: A network entity comprising means for performing a method of any one of aspects 22 through 39.

Aspect 42: An article of manufacture comprising a non-transitory computer-readable medium having stored therein instructions executable by one or more processors of a network entity to perform a method of any one of aspects 22 through 39.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 9, 11-13, 16, and/or 19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) configured for wireless communication, the UE comprising:
   one or more memories; and
   one or more processors coupled to the one or more memories, the one or more processors being configured to:
   receive a plurality of packets over time from a network entity;
   transmit combined acknowledgement information comprising respective first acknowledgement information for one or more packets of the plurality of packets to the network entity within an uplink resource;
   transmit turbo acknowledgement information comprising respective second acknowledgement information and respective channel state information (CSI) feedback for one or more remaining packets of the plurality of packets to the network entity within the uplink resource; and
   receive a turbo acknowledgement configuration from the network entity, the turbo acknowledgement configuration indicating a number of the one or more remaining packets.

2. The UE of claim 1, wherein the one or more remaining packets comprise a single packet of the plurality of packets.

3. The UE of claim 2, wherein the single packet is a last received packet of the plurality of packets.

4. The UE of claim 1, wherein the one or more remaining packets comprises a plurality of remaining packets.

5. The UE of claim 4, wherein the
   turbo acknowledgement configuration indicates a number of the plurality of remaining packets from the network entity.

6. The UE of claim 5, wherein the number of the plurality of remaining packets is a given number of last received packets of the plurality of packets.

7. The UE of claim 5, wherein the turbo acknowledgement configuration comprises a bitmap or pattern indicating the number of the plurality of remaining packets.

8. The UE of claim 5, wherein the one or more processors are further configured to:
   receive a medium access control (MAC) control element (MAC-CE) or radio resource control message comprising the turbo acknowledgement configuration.

9. The UE of claim 5, wherein the one or more processors are further configured to:
   receive downlink control information scheduling the plurality of packets, the downlink control information further comprising the turbo acknowledgement configuration.

10. The UE of claim 5, wherein the plurality of packets comprise semi-persistently scheduled (SPS) occasions associated with two or more SPS configurations, and wherein the one or more processors are further configured to:
    receive downlink control information comprising an activation or reactivation of the two or more SPS configurations and the turbo acknowledgement configuration.

11. The UE of claim 10, wherein the turbo acknowledgement configuration indicates a respective number of the plurality of remaining packets for each of the two or more SPS configurations.

12. The UE of claim 4, wherein the turbo acknowledgement information indicates a time offset between consecutive ones of the plurality of remaining packets.

13. The UE of claim 4, wherein the turbo acknowledgement information comprises absolute CSI values for at least one packet of the plurality of remaining packets and either an average CSI value for other packets of the plurality of remaining packets or differential CSI values with respect to the absolute CSI values for the other packets of the plurality of remaining packets.

14. The UE of claim 4, wherein the turbo acknowledgement information comprises lowest absolute CSI values associated with at least one packet of the plurality of remaining packets.

15. The UE of claim 4, wherein the turbo acknowledgement information comprises at least one of a mean, auto-correlation or auto-covariance of CSI reports associated with the plurality of remaining packets.

16. The UE of claim 4, wherein the plurality of packets comprise semi-persistently scheduled (SPS) occasions associated with two or more SPS configurations.

17. The UE of claim 16, wherein the turbo acknowledgement information comprises a respective CSI report for each of the two or more SPS configurations in an order of the two or more SPS configurations.

18. The UE of claim 16, wherein each of the two or more SPS configurations comprises a respective SPS priority, and the turbo acknowledgement information comprises a respective CSI report for each of the SPS priorities of the two or more SPS configurations.

19. A method operable at a user equipment (UE), the method comprising:
receiving a plurality of packets over time from a network entity;
transmitting combined acknowledgement information comprising respective first acknowledgement information for one or more packets of the plurality of packets to the network entity within an uplink resource;
transmitting turbo acknowledgement information comprising respective second acknowledgement information and respective channel state information (CSI) feedback for one or more remaining packets of the plurality of packets to the network entity within the uplink resource; and
receiving a turbo acknowledgement configuration indicating a number of the one or more remaining packets from the network entity.

20. The method of claim 19, wherein the one or more remaining packets comprises a plurality of remaining packets, and
the turbo acknowledgement configuration indicates a number of the plurality of remaining packets from the network entity.

21. The method of claim 20, wherein the turbo acknowledgement configuration comprises a given number of last received packets of the plurality of packets as the number of the plurality of remaining packets or a bitmap or pattern indicating the number of the plurality of remaining packets.

22. The method of claim 20, wherein the plurality of packets comprise semi-persistently scheduled (SPS) occasions associated with two or more SPS configurations, and wherein the receiving the turbo acknowledgement configuration further comprises:
receiving downlink control information comprising an activation or reactivation of the two or more SPS configurations and the turbo acknowledgement configuration.

23. A network entity configured for wireless communication, the network entity comprising:
one or more memories; and
one or more processors coupled to the one or more memories, the one or more processors being configured to:
transmit a plurality of packets over time;
receive combined acknowledgement information comprising respective first acknowledgement information for one or more packets of the plurality of packets within an uplink resource;
receive turbo acknowledgement information comprising respective second acknowledgement information and respective channel state information (CSI) feedback for one or more remaining packets of the plurality of packets within the uplink resource; and
transmit a turbo acknowledgement configuration indicating a number of the one or more remaining packets.

24. The network entity of claim 23, wherein the one or more remaining packets comprises a plurality of remaining packets.

25. The network entity of claim 24, wherein the
turbo acknowledgement configuration indicates a number of the plurality of remaining packets.

26. The network entity of claim 24, wherein the turbo acknowledgement information indicates a time offset between consecutive ones of the plurality of remaining packets.

27. The network entity of claim 24, wherein the turbo acknowledgement information comprises absolute CSI values for at least one packet of the plurality of remaining packets and either an average CSI value for other packets of the plurality of remaining packets or differential CSI values with respect to the absolute CSI values for the other packets of the plurality of remaining packets.

28. The network entity of claim 24, wherein the turbo acknowledgement information comprises lowest absolute CSI values associated with at least one packet of the plurality of remaining packets.

29. The network entity of claim 24, wherein the plurality of packets comprise semi-persistently scheduled (SPS) occasions associated with two or more SPS configurations and the turbo acknowledgement information comprises a respective CSI report for each of the two or more SPS configurations in an order of the two or more SPS configurations.

30. A method operable at a network entity, comprising:
transmitting a plurality of packets over time;
receiving combined acknowledgement information comprising respective first acknowledgement information for one or more packets of the plurality of packets within an uplink resource;
receiving turbo acknowledgement information comprising respective second acknowledgement information and respective channel state information (CSI) feedback for one or more remaining packets of the plurality of packets within the uplink resource; and
transmitting a turbo acknowledgement configuration indicating a number of the one or more remaining packets.

* * * * *